(12) United States Patent
Dorwart

(10) Patent No.: US 7,266,773 B2
(45) Date of Patent: Sep. 4, 2007

(54) SYSTEM AND METHOD FOR CREATING A GRAPHICAL PRESENTATION

(75) Inventor: Richard W. Dorwart, San Francisco, CA (US)

(73) Assignee: Efficient Analytics, Inc., San Francisco, CA (US)

( * ) Notice: Subject to any disclaimer, the term of this patent is extended or adjusted under 35 U.S.C. 154(b) by 619 days.

(21) Appl. No.: 10/682,667

(22) Filed: Oct. 9, 2003

(65) Prior Publication Data

US 2004/0083425 A1 Apr. 29, 2004

Related U.S. Application Data

(63) Continuation-in-part of application No. 10/279,620, filed on Oct. 24, 2002, now abandoned.

(51) Int. Cl.
*G06F 3/00* (2006.01)

(52) U.S. Cl. .................. 715/731; 715/730; 715/732

(58) Field of Classification Search ........... 715/964, 715/502, 503, 730, 731, 732; 345/35
See application file for complete search history.

(56) References Cited

U.S. PATENT DOCUMENTS

| 5,581,677 | A | | 12/1996 | Myers et al. |
| 5,893,123 | A | | 4/1999 | Tuinenga |
| 5,933,830 | A | * | 8/1999 | Williams ............... 707/100 |
| 6,119,218 | A | * | 9/2000 | Arora et al. ............ 712/207 |
| 6,344,859 | B1 | * | 2/2002 | Alimpich et al. ........ 715/762 |
| 6,369,835 | B1 | | 4/2002 | Lin |
| 6,374,260 | B1 | | 4/2002 | Hoffert et al. |
| 2003/0030672 | A1 | * | 2/2003 | Hughes et al. ......... 345/765 |
| 2003/0050928 | A1 | * | 3/2003 | Hays ..................... 707/6 |
| 2004/0073596 | A1 | | 4/2004 | Kloninger et al. |
| 2004/0117358 | A1 | * | 6/2004 | von Kaenel et al. ...... 707/3 |

OTHER PUBLICATIONS

Microsoft. "Microsoft Office PowerPoint 2000", published in year 2000, p. 1-23.*
Microsoft PowerPoint 2000 screen captures, p. 1.*
Published book title, 'Special Edition Using Microsoft Office XP' pp. 1-13, Que, May 22, 2001.*
"Web-Based Online Reporting: Beyond 20/20 offers easy and cost effective data dissemination," Daniel Mathews, Marketing Research, Winter 2001, pp. 46-47.

* cited by examiner

*Primary Examiner*—Ba Huynh
*Assistant Examiner*—TuyetLien Tran
(74) *Attorney, Agent, or Firm*—Gregory J. Koerner; Redwood Patent Law

(57) ABSTRACT

A system and method for creating graphical presentations is disclosed. A pre-existing graphical presentation is scanned. Data points are extracted from the pre-existing graphical presentation. Corresponding data points are extracted from tabulated data. These corresponding data points are then inserted into the pre-existing graphical presentation to create a new graphical presentation. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims. 37 CFR 1.72(b).

14 Claims, 27 Drawing Sheets

| | A | B |
|---|---|---|
| 10 | | |
| 11 | | |
| 12 | | |
| 13 | Welcome to the PerMetrics Profile Workbook | |
| 14 | The profile associated with this basesheet is: | |
| 15 | | |
| 16 | Profile name/path: —801 | |
| 17 | Profile questionlist sheet name: —802 | |
| 18 | Banner profile sheet name: —803 | |
| 19 | | |
| 20 | Tabulated data file name/path: —804 | C:\PerMetrics\test\basesheet.xls —815 |
| 21 | Tabulated data sheet name: —805 | questlist |
| 22 | Tab pre-load sheet name: —806 | banners |
| 23 | Tab load sheet name: —807 | |
| 24 | Length of tabs (# of Rows) —808 | C:\PerMetrics\test\tabsext.xls |
| 25 | Next table title marker (leftmost, recurring characters only)* —809 | Sheet1 |
| 26 | Last table title marker (leftmost, recurring only) —810 | pre-load |
| 27 | Column last table title marker occurs in ("a" or "b" etc.) —811 | load |
| 28 | | 300 |
| 29 | PowerPoint report file name/path: —812 | Q. |
| 30 | SPSS data file name/path: —813 | Q. |
| 31 | Word report file name/path: —814 | a |
| 32 | | 816 |
| | | C:\PerMetrics\Test1.ppt —817 |
| | | 818 |
| | | 819 | path names / questlist / banners /
820      821      822

| | A | B | C | D | E | F | G | H | I | J | K | L |
|---|---|---|---|---|---|---|---|---|---|---|---|---|
| 1 | | | | | | | | | | | | |
| 2 | Banner 1 as is: | | ALL | AD | Non-AD | | NOT | Light | Medium | Heavy | Light | Medium |
| 3 | 871 | | Respondents | Market | Market | Aware | Aware | AD | AD | AD | User | User |
| 4 | | | 873 | 875 | 876 | | | | | | | |
| 5 | | | | | | | | | | | | |
| 6 | | | | | | | | | | | | |
| 7 | | | | | | | | | | | | |
| 8 | | | | | | | | | | | | |
| 9 | | | | | | | | | | | | |
| 10 | | | | | | | | | | | | |
| 11 | 872 | | | | | | | | | | | |
| 12 | Banner 2 as it apperas in PowerPoint: | | | | | | | | | | | |
| 13 | | | | | 878 | | | | | | | |
| 14 | | | 874 | 877 | | | | | | | | |
| 15 | Banner 2 as is: | | TOTAL | AD MR | NON AD | Aware | N AW | Lit AD | Med AD | HVY AD | LIT NA | MED NA |
| 16 | | | | | | | | | | | | |
| 17 | | | | | | | | | | | | |
| 18 | | | | | | | | | | | | |
| 19 | | | | | | | | | | | | |

870 path names — 820
questlist — 821
banners — 822

FIG. 12

| | A | B | C | D | E | F | G | H | I | J | K | L |
|---|---|---|---|---|---|---|---|---|---|---|---|---|
| 659 | | | | | | | | | | | | |
| 660 | | | | | | | | | | | | |
| 661 | Table 039 | | | | | | | | | | | |
| 662 | Purchase Intention | | | | | | | | | | | |
| 663 | Q4 | | | | | | | | | | | |
| 664 | | Base | of org work | for wid you | endorse a purchase from Comp | | K again? | Overall Satisfaction | | | | |
| 665 | | All | Academic | ovement | Business | Yes | No | Don't Know | Satis | Not Satisfied | | |
| 666 | Base | 325 | 470 | 190 | 265 | 695 | 70 | 160 | 415 | 510 | | |
| 667 | Product P | | | | | | | | | | | |
| 668 | Top 2 Bos | 40 | 35 | 45 | 40 | 42 | 38 | 41 | 37 | 44 | | |
| 669 | Bottom 3 | 60 | 65 | 55 | 60 | 58 | 62 | 59 | 63 | 56 | | |
| 670 | | | | | | | | | | | | |
| 671 | Product Q | | | | | | | | | | | |
| 672 | Top 2 Bos | 46 | 47 | 46 | 48 | 52 | 38 | 46 | 48 | 44 | | |
| 673 | Bottom 3 | 54 | 53 | 54 | 52 | 40 | 62 | 54 | 52 | 56 | | |
| 674 | | | | | | | | | | | | |
| 675 | | | | | | | | | | | | |
| 676 | Table 040 | | | | | | | | | | | |
| 677 | Purchase Intention | | | | | | | | | | | |
| 678 | Q4 | | | | | | | | | | | |
| 679 | | Base | spondent | level | | | Region | | | | Org Size | |
| 680 | | All | ecision ma | sion influe | Northwest | Southwest | North Centr | South | Northeast | Southeast | med/Media | Large |
| 681 | Base | 325 | 550 | 375 | 135 | 145 | 160 | 120 | 250 | 175 | 595 | 330 |
| 682 | Product P | | | | | | | | | | | |
| 683 | Top 2 Bos | 40 | 39 | 41 | 50 | 52 | 57 | 33 | 21 | 20 | 40 | 41 |
| 684 | Bottom 3 | 60 | 61 | 59 | 50 | 48 | 43 | 67 | 79 | 74 | 60 | 59 |
| 685 | | | | | | | | | | | | |
| 686 | Product Q | | | | | | | | | | | |
| 687 | Top 2 Bos | 46 | 48 | 45 | 32 | 33 | 29 | 52 | 60 | 55 | 49 | 44 |
| 688 | Bottom 3 | 54 | 52 | 55 | 60 | 67 | 71 | 48 | 40 | 45 | 51 | 56 |
| 689 | | | | | | | | | | | | |
| 690 | | | | | | | | | | | | |

Subheadings

FIG. 19

SYSTEM AND METHOD FOR CREATING A GRAPHICAL PRESENTATION

RELATED APPLICATIONS

This application is a continuation-in-part application of Ser. No. 10/279,620 filed Oct. 24, 2002 now abandoned entitled, "SYSTEM AND METHOD FOR AUTOMATIC DATA EXTRACTION, MANIPULATION AND CHARTING".

FIELD OF THE INVENTION

The present invention relates generally to information management, more particularly, to systems and methods for generating data charts and/or graphs using information extracted from data tables in a spreadsheet.

BACKGROUND

Research and analysis of raw data is important in a wide variety of fields, and typically involves traversing isolated information sources including paper reports and internal databases such as the Microsoft Excel™ spreadsheet to extract and analyze data in business, government, and academic settings. By way of example, each chart or slide in a PowerPoint™ presentation is prepared individually by extracting data by hand from an Excel™ spreadsheet format and by entering the data manually into the presentation program.

Even in the computer age, the task of generating data charts and the like from data sources is often tedious and requires a significant amount of time. One might conclude that today's information worker is much like the previous generation's factory worker assembling parts alongside a conveyer belt. The task is no longer to refine an endless stream of raw materials into physical goods, but rather to refine an ever-increasing amount of raw data into an understandable form.

An example of such 'industrialized' information work is the custom or 'ad hoc' market research ("MR") industry. The MR industry serves virtually all of the nation's major companies from consumer packaged goods to industrial products to services of every type. Market research vendors provide technical research design, implementation, and analytical services for their clients.

Market researchers typically tabulate raw data, such as data regarding consumer responses to various questions about a particular product and/or service, into books of data tables that researchers can refer to when they conduct their analysis. The information in the data tables is then presented in a user-friendly format, such as in charts and/or graphs created using an application like PowerPoint™, so that the results can be easily understood by clients. Putting the data into this user-friendly format is usually the job of the market researcher. For instance, the charting task often entails physically paging through a book or electronic version of data tables that can be thousands of pages long, selecting the needed data, and then manually typing or pasting the data into dozens if not hundreds of individual PowerPoint™ charts. It is not uncommon for this part of a market research job to take a researcher about 50 man-hours to complete.

What is needed is a system and method for expediting the process of finding and extracting specified data from data tables and for changing that data into an understandable, comprehensive form.

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

FIG. 10 is a profile worksheet with file paths according to one embodiment of the present invention.

FIG. 11 is a profile worksheet according to one embodiment of the present invention.

FIG. 12 is another profile worksheet according to one embodiment of the present invention.

FIG. 19 is an example showing subheadings in the tabulated data.

DETAILED DESCRIPTION

A system and method for data extraction and charting is described. In the following description numerous specific details are set forth, such as particular computer programs, an example use of the invention in the market research field, and details regarding particular types of tabulated data, in order to provide a thorough understanding of the present invention. However, persons having ordinary skill in the information management arts will appreciate that these specific details may not be needed to practice the present invention.

According to an embodiment of the present invention, object linking and embedding technology ("OLE"), such as Microsoft's OLE Automation Technology, is used to program various applications. The applications may include Microsoft Excel™, PowerPoint™, SPSS™, or any other types of commercially available software packages that support automation. The invention automatically extracts specific figures from one or more data tables and then inserts these figures into a presentation. The presentation may be a graphical, tabular, and/or chart representation of the data tables. A set of business rules and processes is implemented using an algorithm according to one embodiment of the present invention. Execution of the algorithm causes specific data to be electronically identified and extracted from one computer program, such as Microsoft Excel™, and inserted and transformed into another program, such as PowerPoint™, thereby automating an information extraction and charting process that has traditionally been tedious and time-consuming.

In one embodiment, the system and method of data extraction and charting is used in the market research industry to efficiently transform large amounts of data located in data tables into a user-friendly format so that the data can be readily analyzed and interpreted. Of course, it should be understood that the present invention may be used in any application where it would be useful to efficiently transform large amounts of data into a graphical and/or chart form. Thus, the present invention has utility in fields such as academic research, investment banking, medical research, and so on.

Figure 1:
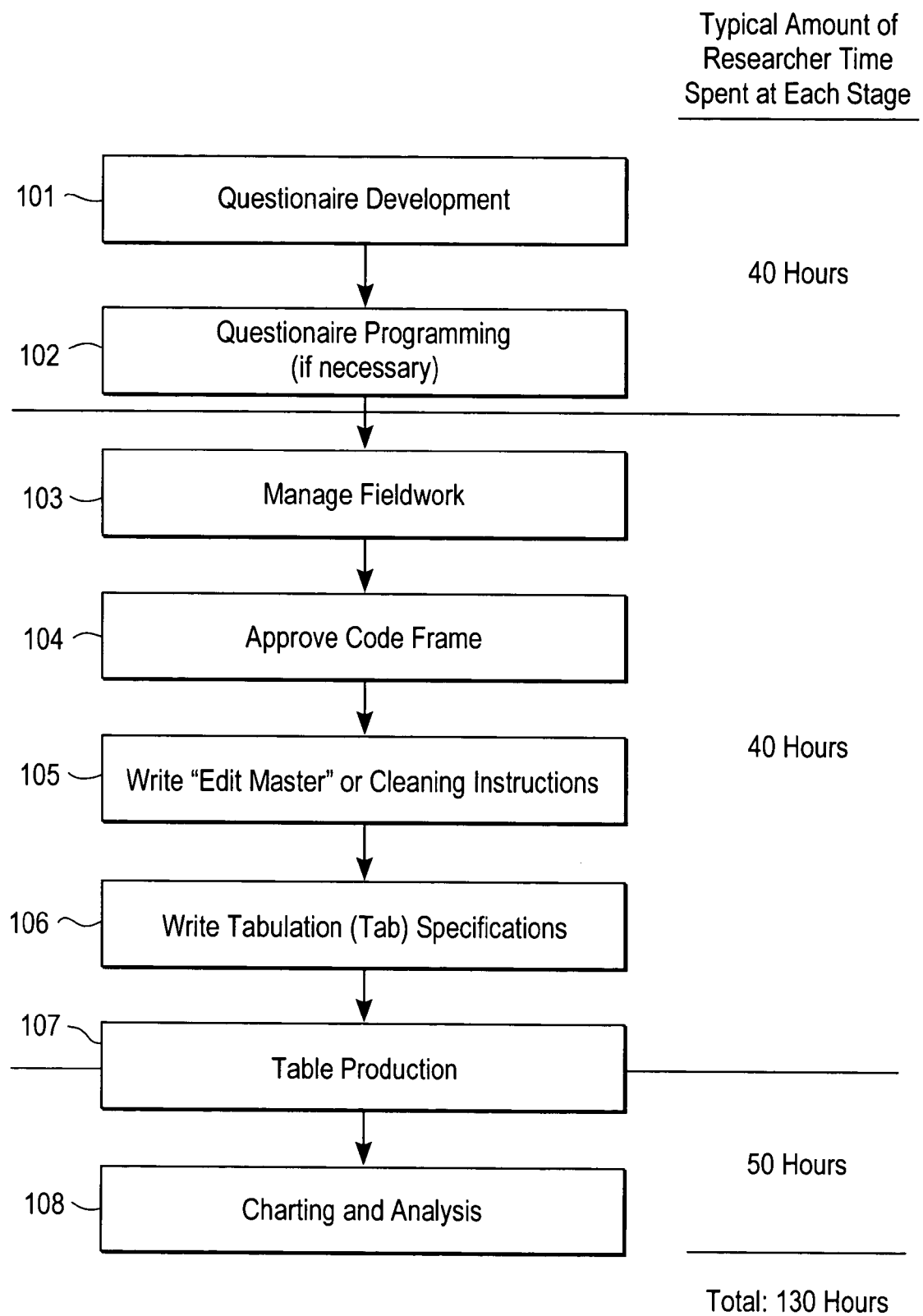
FIG. 1 is a flow chart illustrating the steps of a prior art process.

Referring now to FIG. 1 there is shown a flow chart illustrating the steps of an exemplary prior art process for conducting market research. FIG. 1 summarizes the market research process from the point of view of a research staff person, such as a project manager or analyst. The sequence of steps shown in FIG. 1 are for customized quantitative projects that involve hundreds or perhaps thousands of interviews. In essence, FIG. 1 shows a complete project cycle from beginning to end. It is important to note that, in practice, every project is different and may incorporate some or all of these steps as appropriate.

First, the scope and nature of the research is defined. The research definition process typically involves creating a questionnaire (block 101) designed to answer specific questions such as product usage frequency, brand awareness, customer satisfaction, brand image, concept and/or product acceptability, etc. Next, questionnaire programming (block 102) is implemented. Questionnaire programming typically involves managing and testing outsourced programming of electronic questionnaires for on-line or computer assisted interviewing, although sometimes questions are still implemented using a manual 'pencil and paper' method.

The first two steps of this process (blocks 101 and 102) usually take about 40-50 hours for an individual market researcher to complete. At the next step, fieldwork is conducted (block 103). This fieldwork usually includes hiring a data collection company to interview consumers and/or potential consumers, monitoring interviews, conducting field briefings, managing incentive payout, etc. The fieldwork potentially involves sampling hundreds, if not thousands, of consumers and/or potential consumers. Once the fieldwork is completed or partially completed a number of the next steps take place in rapid succession and in some cases simultaneously. For example, responses from any open-ended questions (e.g., "What did you like about the advertisement you saw?") need to be fit into a master code frame (block 104). During this process, open-ended question responses are transformed into a single sentence that catches the meaning of the response. For example, if some people say they like the color of the product, and other people said they like the fact that the product is blue, these responses would simply be transformed into a single code that says "color". Then, the open-and closed-ended data are aggregated and cleaned (block 105) to ensure the integrity of the data tables, for instance, to ensure that there are no blank responses and that questions were asked of the correct respondents. Concurrently, the tabulation specifications and programming are developed (block 106), which includes specifying data table banner points and stubs, as well as creating the table bases and general layout. When both the tabulation specifications and program have been written and the data coded, aggregated and cleaned, then data tables are produced (block 107) that organize the data collected from the completed field work. Frequently, tab programming is outsourced to a data-processing house that uses an industrial tabulation software package like Quantum™ or Uncle™. The steps in this process (blocks 103-107) may take a typical market researcher 40 hours to complete. Finally, the data in the tables is charted and analyzed (block 108). That is, the data is manually entered from the data tables into a program such as PowerPoint™ and then transformed into presentation quality graphics that illustrate the analysis of the data.

Figure 2:
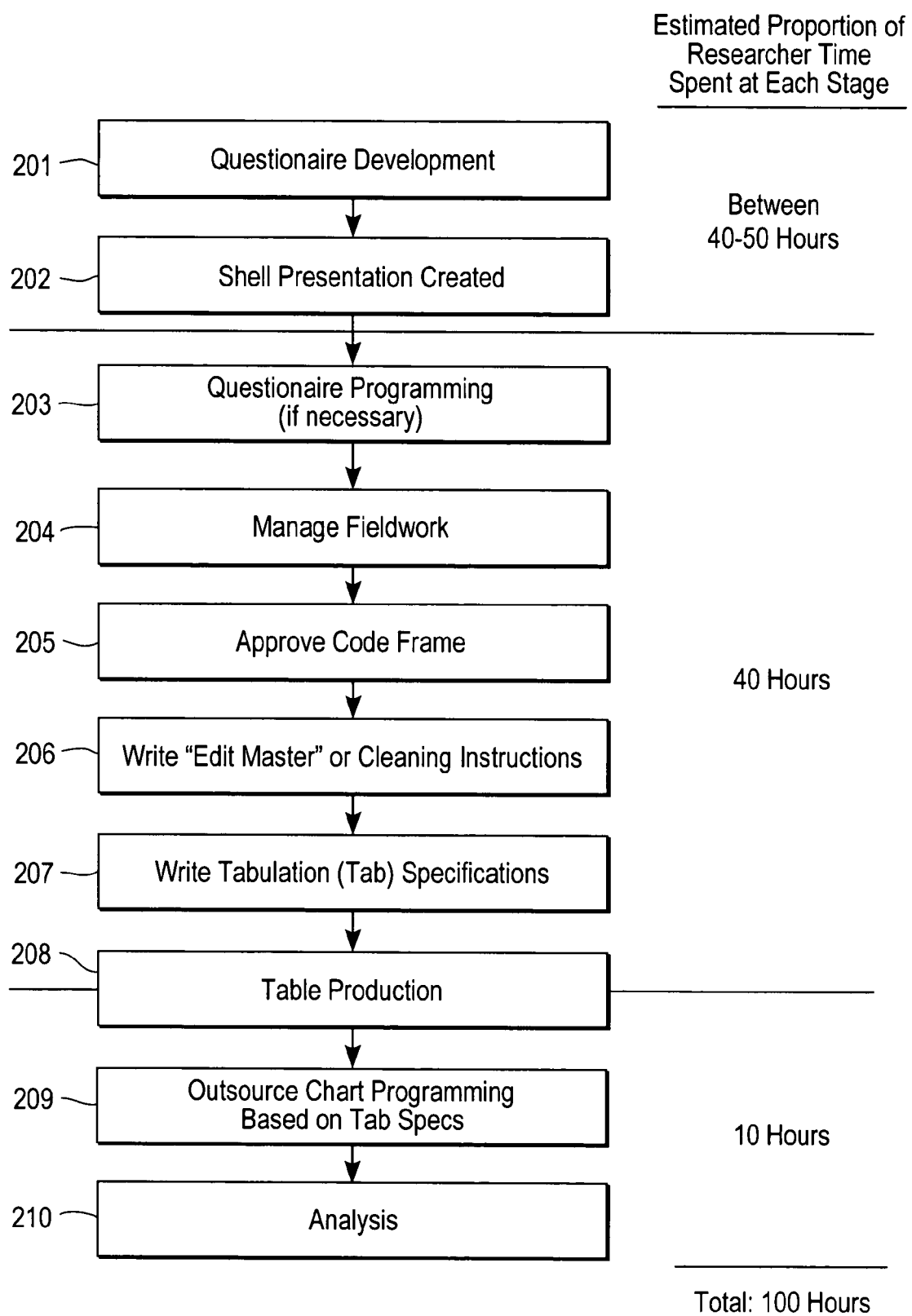
FIG. 2 is a flow chart illustrating the market research process according to one embodiment of the present invention.

Referring now to FIG. 2 there is shown a flow chart illustrating the market research process according to one embodiment of the present invention. First, a questionnaire is developed (block 201). A shell presentation to be populated by data is created (block 202). This step is only necessary if a shell presentation or a prior graphical presentation has not already been implemented. Next, questionnaire programming (block 203) is implemented, field work is conducted (block 204), and data is fit into a master code frame (block 205). In the next steps, the data is cleaned (block 206) and data tables are created (block 207). The creation of the data tables (block 207) may be outsourced and run on an industrial tab package such as Quantum™ (as is shown in FIG. 2) or may be automated according to another embodiment of this invention. That is, the data tables may be created according to an algorithm which uses a desktop application, such as SPSS, to automate the tabulations, run them, and then export the data tables back to a program such as Excel. A desktop programming language, for example, SPSS syntax, Visual Basic, or other types of computer programming languages may be used to write an algorithm to allow a user to record the types of data tables that are being created. Once the user has recorded this information, when the user gets a new data set, the user can create the same data tables out of raw data by simply running the code. Once the data tables are created, the data in the data tables is automatically transformed into a graphical presentation by outsourcing chart programming based on the tabulation specifications (in practice, chart automation may be programmed based on tabulation specifications, an interim tabulation itself or both) (block 208). In this manner, the graphical presentations are produced (block 209). The outsourcing involves an implementation of the invention. That is, a consultant may be employed by the market researcher to implement an algorithm that automatically transforms specified tabulated data in the data tables into graphical presentations. Alternatively, the market researcher could use a software package including a user-interface to automatically transform the tabulated data in the data tables into graphical presentations (not shown in this view). In this case, the charting would not be outsourced, but would be conducted by the market researcher. The algorithm used to create the graphical presentations will be described in more detail herein. The charts may then be analyzed by one or more market researchers (block 210). In this manner, rather than spending 50 hours on charting and analysis, a market researcher can typically create effective graphical presentations to illustrate his/her analyses in under 10 hours.

Figure 3:
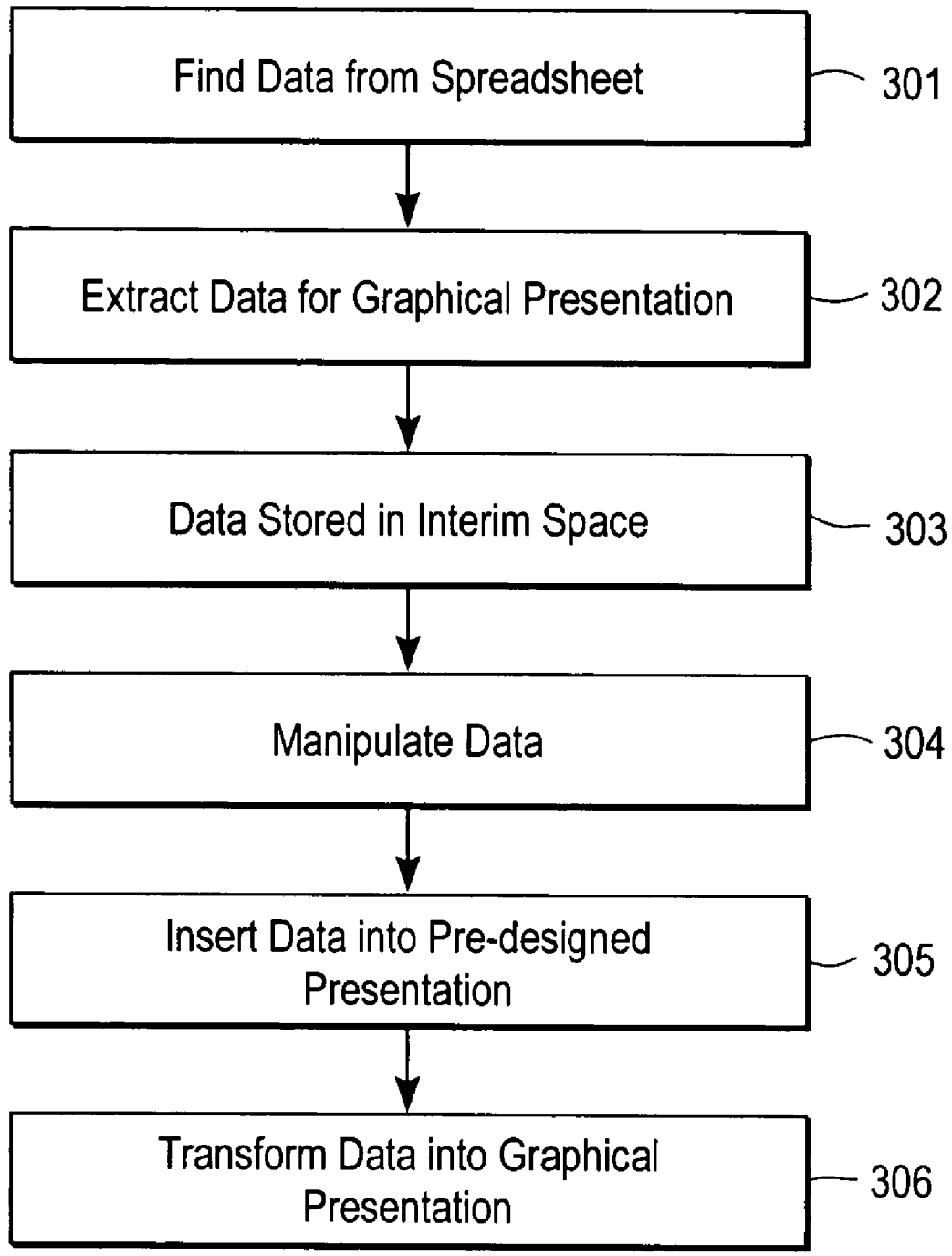
FIG. 3 is a flow chart that shows the steps of creating a graphical presentation using tabulated data extracted from a spreadsheet according to one embodiment of the present invention.

Referring now to FIG. 3 there is shown a flow chart that shows the steps of creating a graphical presentation from tabulated data in a spreadsheet according to one embodiment of the present invention. The steps may be implemented according to an algorithm written in software such as Java, Visual Basic, C++, or other types of programming languages that can be stored in a computer readable medium.

The first step of the program identifies data for the particular question of interest from the tabulated data in the spreadsheet (block 301). For example, questionnaire respondents may be asked what their purchase intention is for a particular product, and may be asked to choose between the responses of "very likely to buy," "neither likely nor unlikely to buy," or "very unlikely to buy." At the first step (block 301) the program finds the response to the question regarding purchase intention from the tabulated data in the spreadsheet (not shown in this view).

In the second step the program extracts the precise data from the tabulated data that is needed for a chart and/or graphical presentation to be created (block 302). A chart may be created, for example, that demonstrates or illustrates how many respondents are "very likely" to purchase a particular product after having seen that product. In this instance, the data that is extracted from the tabulated data indicates the number of people, (in this example 35 people), from a particular sample group of people polled, (e.g., 100 people), who are "very likely" to purchase the product (not shown in this view).

Once the proper data is extracted, it is stored in an interim space (block 303). For example, the data may be stored in another spreadsheet in Excel™ in the tabulated data file. Of course, the data may be stored in other locations on the computer (not shown in this view) as well. Next, the storage program may manipulate the data in order to shape it as required to create a specified chart, graph, or table in the graphical presentation (block 304). Finally, object linking and embedding ("OLE") technology or another technology that performs a similar function is used to automatically insert the stored data into a presentation format (block 305). In one embodiment of the present invention, Microsoft's OLE Automation Technology is used, but other OLE technologies may be used as well. In this manner, the extracted data is automatically transformed into an easy-to-read graphical presentation (block 306) that displays the data in a coherent, understandable, summary form.

Figure 4A:
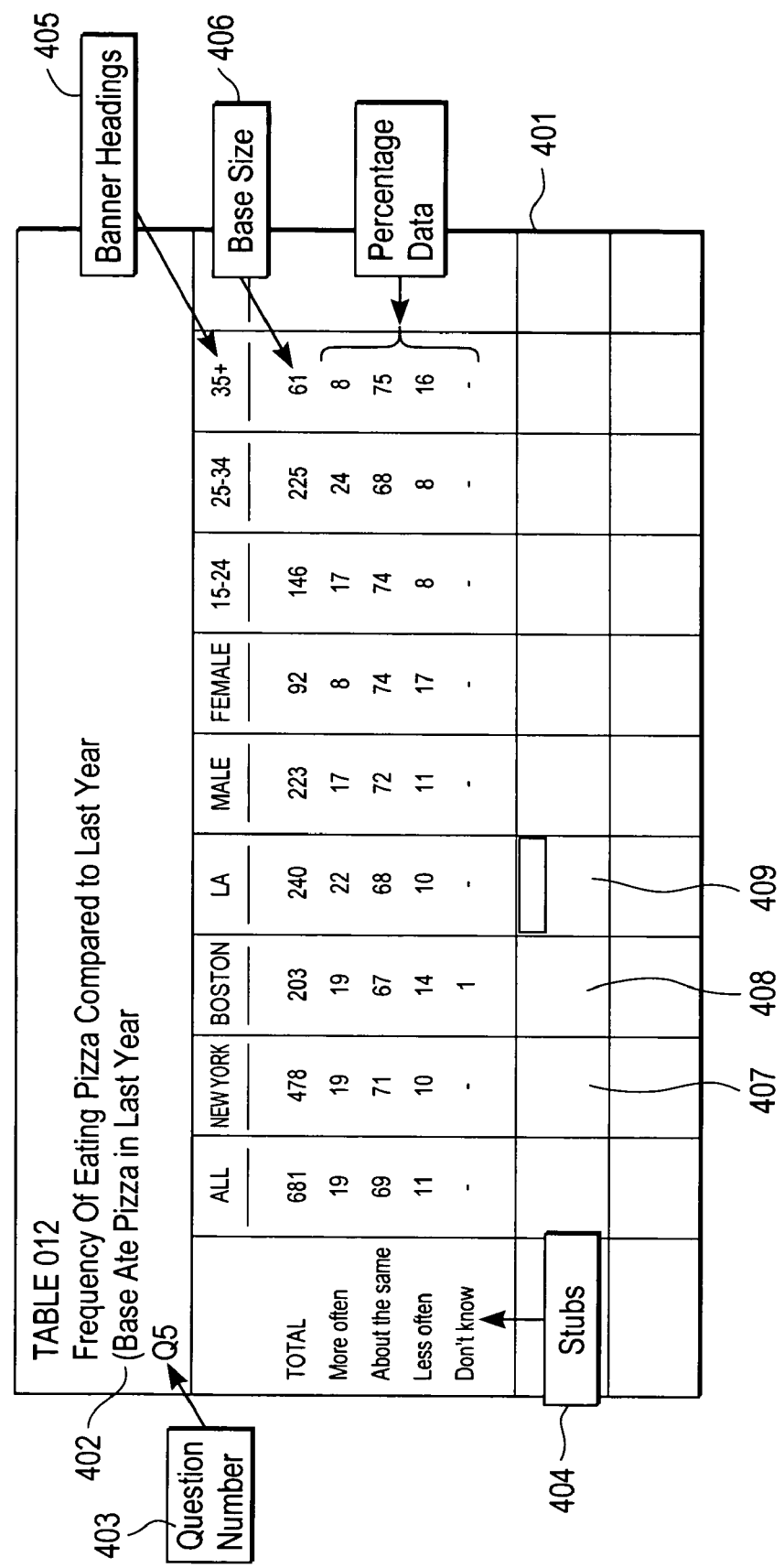
FIG. 4A is an example of tabulated data stored in a spreadsheet according to one embodiment of the present invention.

Turning now to FIG. 4A there is shown an example of tabulated data stored in a spreadsheet according to one embodiment of the present invention. In the example illustrated by FIG. 4A, the sample tabulated data 401 is located in a spreadsheet in Excel™, but as noted herein, the data may be located in numerous other programs as well. The data in FIG. 4A was gathered from a questionnaire that included a question about the annual frequency of people's pizza eating habits for given segments of the population. The base sample 402 only includes people who actually ate pizza in the last year. The sample tabulated data 401 demonstrates the response to question number five ("Q5") 403 in the survey. The stubs 404 include the following response selections: "More Often," "About the Same," "Less Often," and "Don't know." The banner headings 405 designate the population surveyed segmented by the geographic locations of New York, Boston, and Los Angeles, by gender, and by the age groups 15-24, 25-34, and 35+. The banner headings 405 also include a heading for "All", which represents the total population that was asked this question in the survey and responded. The base size 406 for each group of respondents is located directly under the base headings 405. The percentage data 406 is displayed in columns 407, 408, 409, etc., below the base size 406 for each population segment.

Figure 4B:
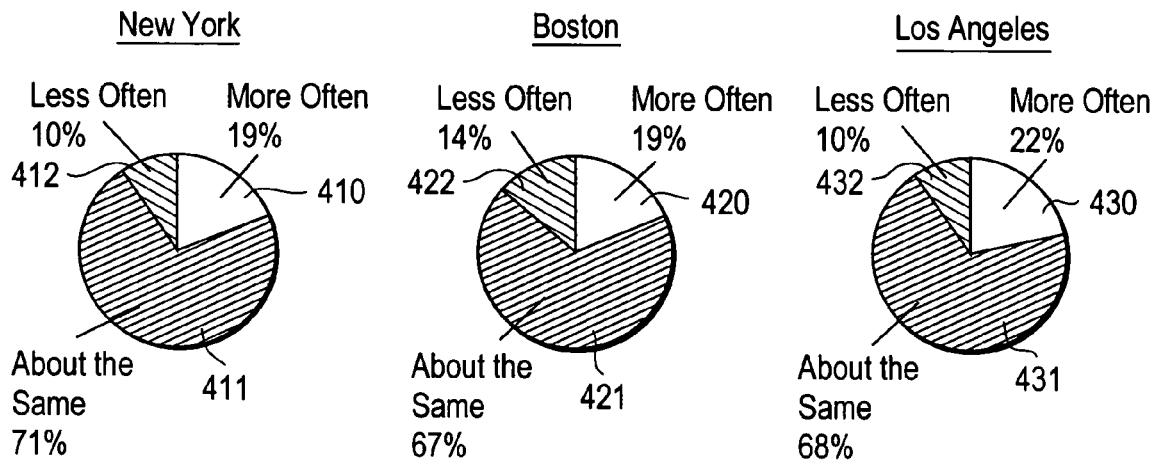
FIG. 4B shows portions of the tabulated data from FIG. 4A transformed into a graphical presentation of one attribute according to one embodiment of the present invention.

FIG. 4B shows portions of the tabulated data from FIG. 4A transformed into a graphical presentation of one attribute according to one embodiment of the present invention. Although the particular data from FIG. 4A only populates three charts in PowerPoint™ (FIGS. 4B-4D), it should be noted that programs may be written to extract precise data from tabulated data in a spreadsheet and to automatically insert the data into hundreds or even thousands of charts in a presentation. In this manner, tabulated data is electronically transformed into graphical presentations. These presentations may be updates of an existing presentation from a previous study or entirely new sets of charts developed in tandem with a given questionnaire. FIG. 4B represents a PowerPoint™ presentation updated with figures from the final tabulated data of FIG. 4A illustrating the responses to the question about frequency of pizza eating segmented by the geographic regions of New York, Boston, and Los Angeles. The percentage data is shown in chart form, with the response "more often" 410, 420, and 430, the response "about the same" 411, 421, and 431, and the responses "less often" 412, 422, and 432, clearly illustrated for each city. In this manner, the graphs effectively illustrate the percentage responses in a readily understood format. In addition, it should be noted that the data may be manipulated (ranked, sorted, transposed, etc.) as necessary to facilitate the chart making process. This manipulation may be conducted in the interim storage space.

Figure 4C:
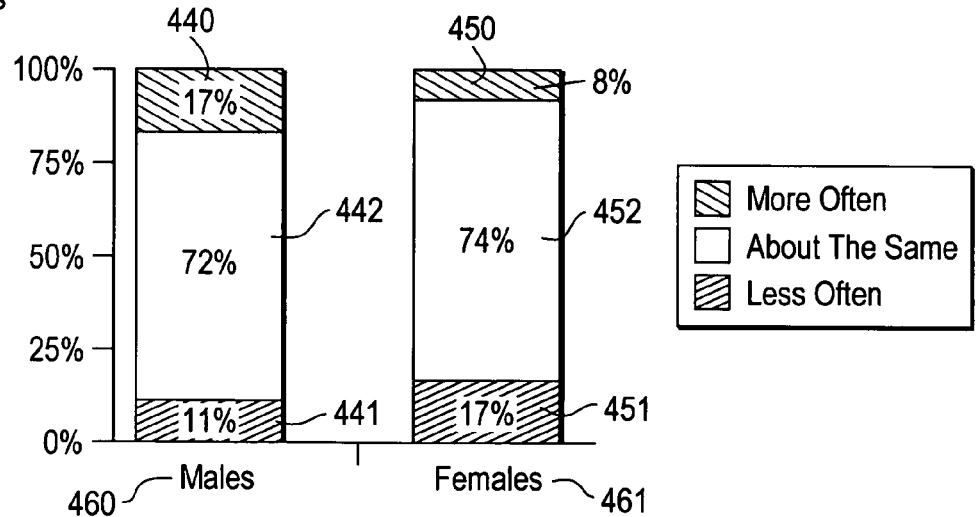
FIG. 4C shows portions of the tabulated data from FIG. 4A transformed into a graphical presentation showing another attribute according to one embodiment of the present invention.

Referring now to FIG. 4C there is shown portions of the tabulated data from FIG. 4A transformed into a graphical presentation showing another attribute according to one embodiment of the present invention. The percentage data is shown in chart form, with the response "more often" 440 and 450, "less often" 441 and 451, and "about the same" 442 and 452, clearly delineated for males 460 and females 461.

Figure 4D:
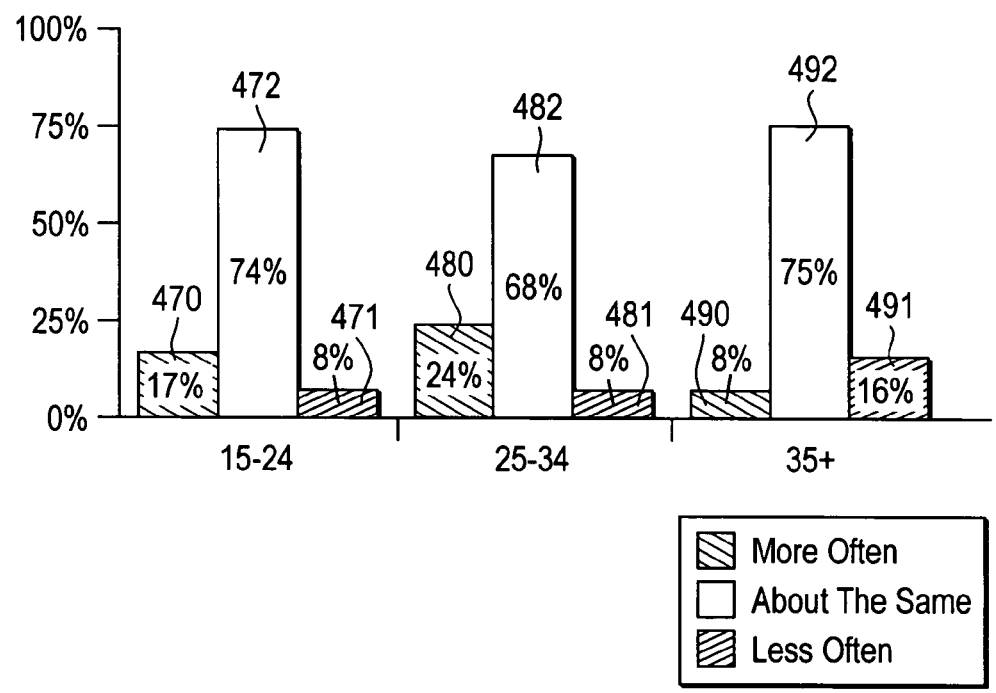
FIG. 4D shows portions of the tabulated data from FIG. 4A transformed into a graphical presentation of yet another attribute according to one embodiment of the present invention.

Turning now to FIG. 4D there is shown portions of the tabulated data from FIG. 4A transformed into a graphical presentation of yet another attribute according to one embodiment of the present invention. In this chart, the percentage data is displayed according to the age groups 15-24, 25-34, and 35+. The responses "more often" 470, 480, and 490, "less often" 471, 481, and 492, and "about the same" 472, 482, and 492 are clearly displayed.

Of course, it should be noted that a wide variety of charts may be created representing in graphical form a variety of data using the present invention. For example, questionnaires regarding customer satisfaction may be implemented (not shown in this view), with charts created showing overall satisfaction scores by population segment, the drivers of satisfaction, and so forth.

Figure 5:
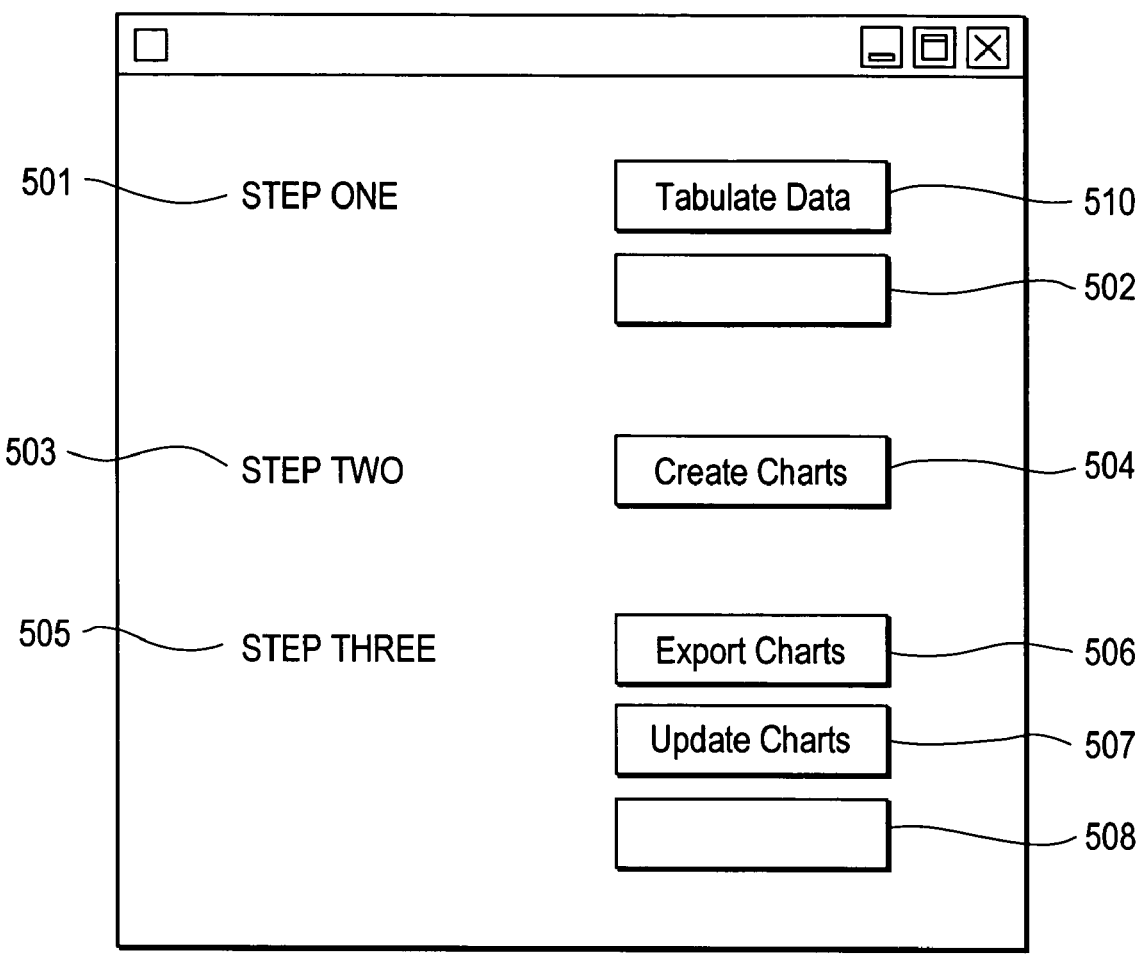
FIG. 5 is a user interface for transforming data into a graphical presentation according to one embodiment of the present invention.

Another embodiment of the present invention provides for a user interface for transforming data into a graphical presentation which is illustrated by FIG. 5. According to this embodiment of the present invention, software code for implementing the steps of extracting specified tabulated data from a spreadsheet and for transforming the data into a graphical presentation is compiled into a visual tool. At step one 501 on the user interface, a user is asked to tabulate data by entering the name of a data file the user wants to run in box 502 and then by clicking on a box entitled "Tabulate Data" 510. At step two 503, a user clicks on the box entitled "Create Charts" 504. At step three 505, the user exports charts or data to a program to implement graphical presentations. For example, the user can click on the box entitled "Export Charts" 506 to export Excel™ charts to a new PowerPoint™ file or the user can click on the box entitled "Update Charts" 507 to update existing PowerPoint™ Charts. If box 507 is selected, the user is asked to specify the name of the PowerPoint™ file the user wants updated in box 508. Either way, a graphical presentation is electronically created using the visual tool of FIG. 5.

Figure 6:
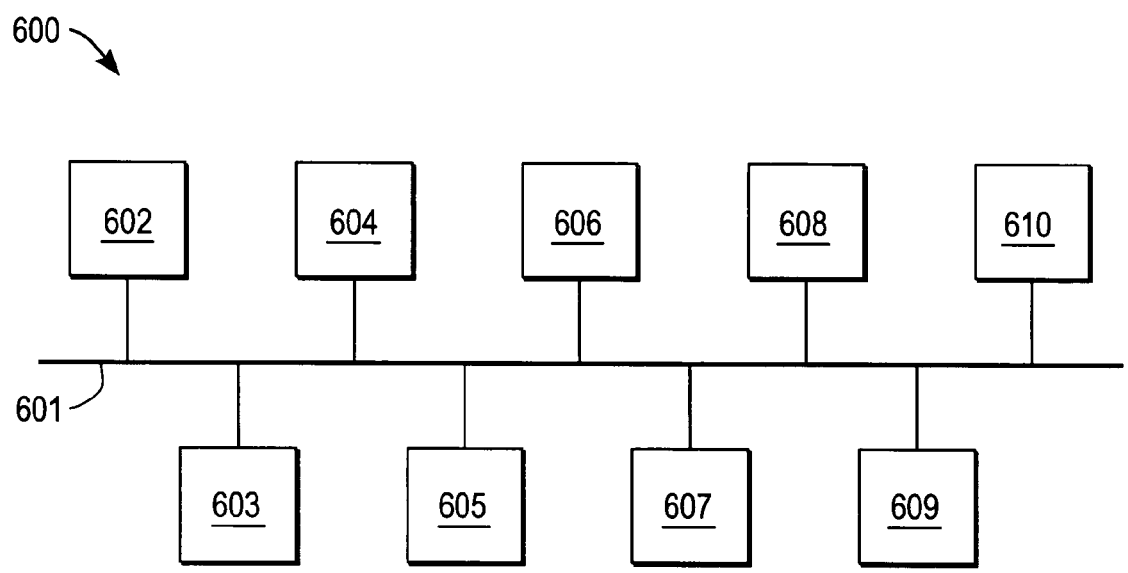
FIG. 6 illustrates a computer system for implementing the method of the present invention.

FIG. 6 illustrates a computer system for implementing the method of the present invention. The computer system 600 includes a processor 602 that executes a program that includes instructions that cause the algorithm to perform the steps of the invention. The processor 602 is coupled through a bus 601 to a random access memory (RAM) 603, a read only memory (ROM) 604, and a mass storage device 605. The ROM 604 may store the program to execute the steps of the invention. The RAM 603 may be used as an interim storage space for the specific tabulated data that is extracted from a spreadsheet, for example. Mass storage device 605 could be a disk or tape drive for storing data and instructions. A display device 606 for providing visual output is also coupled to processor 602 through bus 601. A user interface (not shown in this view) may be displayed on the display device 606. Keyboard 607 is coupled to bus 601 for communicating information and command selections to processor 602. Another type of user input device is cursor control unit 608, which may be a device such as a mouse or trackball, for communicating direction commands that control cursor movement on display 609. For example, the cursor control until 608 may be used to click on a box (not shown in this view) that will transform the tabulated data into graphical presentations. Further coupled to processor 602 through bus 601 is an input/output (I/O) interface 610 which can be used to control and transfer data to electronic devices connected to computer 600, such as other computers, tape records, and the like.

Network interface device 610 is coupled to bus 601 and provides a physical and logical connection between computer system 600 and a network medium, such as the Internet (not shown in this view). Depending on the network environment in which computer 600 is used, this connection is typically to a server computer, but it can also be to a network router to another client computer. Note that the architecture of FIG. 6 is provided only for purposes of illustration, and that a client computer used in conjunction with the present invention is not limited to this specific architecture.

According to yet another embodiment of the present invention, an algorithm is utilized to automatically read through chart objects on pre-existing graphical presentations located on a computer program, such as PowerPoint™. The program then searches through tabulated data on a second computer program, such as Excel™, to find data corresponding to the selected chart objects. The new data is then extracted from the tabulated data and inserted into the pre-existing graphical presentation to create a new graphical presentation representing the newly inserted data. The difference between this embodiment and those described up until this point is that this embodiment may be applied to any quantitative research project. The code is not limited to any one specific project.

Figure 7A:
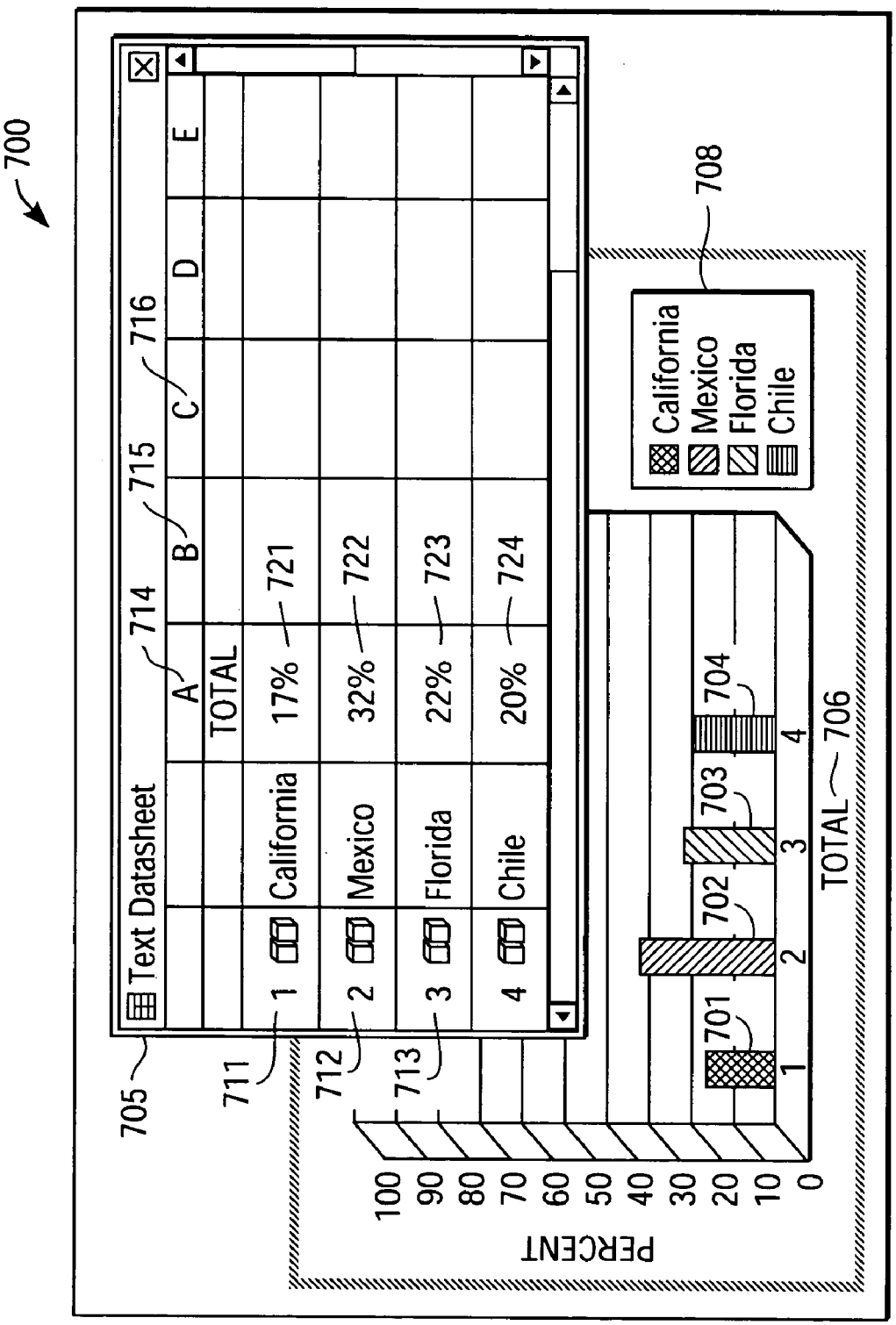
FIG. 7A illustrates a graphical presentation including data points according to one embodiment of the present invention.

FIG. 7A illustrates an exemplary chart object including data points according to one embodiment of the present invention. In the embodiment illustrated by FIG. 7A, the chart object 700 is presented in a PowerPoint™ slide, but other types of graphical presentation programs may be utilized as well. For example, data could be extracted from Excel™ and inserted into a Microsoft Word™ table.

The lines 701-704 in the graphical presentation 700 of FIG. 7A represent percentages of a total base sample (Total) 706 that purchased oranges from various geographical locations within the past six months. As is apparent from FIG. 7, 20% of the Total 106 purchased oranges from Chile, 22% purchased oranges from Florida, 32% purchased oranges from Mexico, and 17% purchased oranges from California in the past six months. To create or update the graphical presentation 700, the data labels ("California", "Mexico", etc.) associated with the percentages are read by a computer program, such as PowerPoint™, from the datasheet 705. This information is then used to extract and re-insert data back into the PowerPoint presentation. The datasheet 705 contains data points (e.g., 721-724) corresponding to chart bars (e.g., lines 701-704) tabulated in rows 711, 712, 713, etc., and columns 714, 715, 716, etc., that typically remain obscured behind the graphical presentation 700 on a user's computer screen 706. To view the datasheet 705, a user double-clicks on any chart object (e.g., the graph) and the datasheet 705 appears on computer screen 706 as is shown in FIG. 7A. Box 708 (the legend) indicates the varying format of lines 701-704 representing the percentage data for each state.

According to one embodiment of the present invention, an algorithm written in software code such as Java, Visual Basic, C++, or other types of programming languages that can be stored in a computer readable medium may be used to scan and then select particular pieces of data from the chart datasheet (705). By way of example, the data may be the percentages associated with the data labels "California", "Mexico", "Florida", and "Chile" represented in legend 708 on the graphical presentation 700 and the "Total" label represented in the first column of datasheet 705. Also it should be clear that the chart object in FIG. 7A may be one of dozens or hundreds contained in the PowerPoint presentation. The algorithm selects a particular chart object 700 from multiple graphical presentations (not shown in this view) stored in different files in PowerPoint™, and then selects particular data labels from the particular chart object. The data labels are then compared to the tabulated data file (in Excel) from which corresponding numbers are then extracted and an updated chart object is formed representing the updated tabulated data.

There may be cases in which the data labels in the datasheet do not contain the labels that are used in the tabulated data file. For example, "Total" in FIG. 7A may be replaced with "Oranges" while Column B might contain data for "Apples" and so on. "Apples" and "Oranges" are proxy labels. When a chart contains proxy labels, the application accounts for this by reading user provided qualifiers from the profile sheet (discussed in section 0041). These qualifiers may either be a banner or stub used in the tabulated data file, whichever is missing from the datasheet. The process of handling proxy labels is called triangulation. The proxy labels may be anything the user wants—i.e., attribute names, time series data labels, subheadings and so forth.

In one embodiment, the application is be implemented so as to handle one set of proxy labels per chart—that is, one or the other of the datasheet banner points or stubs must contain data labels that are used in the tabulated data. Alternatively, double-proxy labeling may be implemented in other embodiments.

The algorithm determines which chart object 700 to choose based on information entered into a profile worksheet that may be stored in a computer program. The profile worksheet, which may be stored in Excel™, for example, and is filled out by a user. The profile worksheet instructs the executing algorithm to find a designated chart object and selected data labels or qualifiers and then to search for data corresponding to these labels in the data tables. The profile worksheet does so by specifying file paths/names and banners and by linking specific tables with chart objects in the presentation as will be described in more detail herein.

After the data labels (qualifiers) are selected, the executing algorithm finds the relevant tabulated data located in Excel™ or located in a similar computer program. Again, the tabulated data file could contain hundreds or thousands of individual data tables. For example, new percentage data from a more recent survey regarding orange purchases from California, Mexico, Florida, and Chile for the Total Sample may be extracted from the tabulated data and then re-inserted into datasheet 705. It should be noted that before the new data is re-inserted into datasheet 705, it is stored in an interim storage space called a "load sheet." In the event that the algorithm cannot find the specific combination of data points it is searching for in the tabulated data, it extracts the entire table that is specified in the profile worksheet. This table is then stored in an interim storage space called a "preload sheet" and the data points can then be loaded into the graphical presentation in some other manner (e.g., by macro) or by an analyst by hand). Once the new data is inserted into datasheet 705, the chart object in PowerPoint is updated to illustrate the new survey results. This process obviates the need for a user to spend time entering new data into a chart object (or set of chart objects) by hand every time survey results are updated.

Figure 7B:
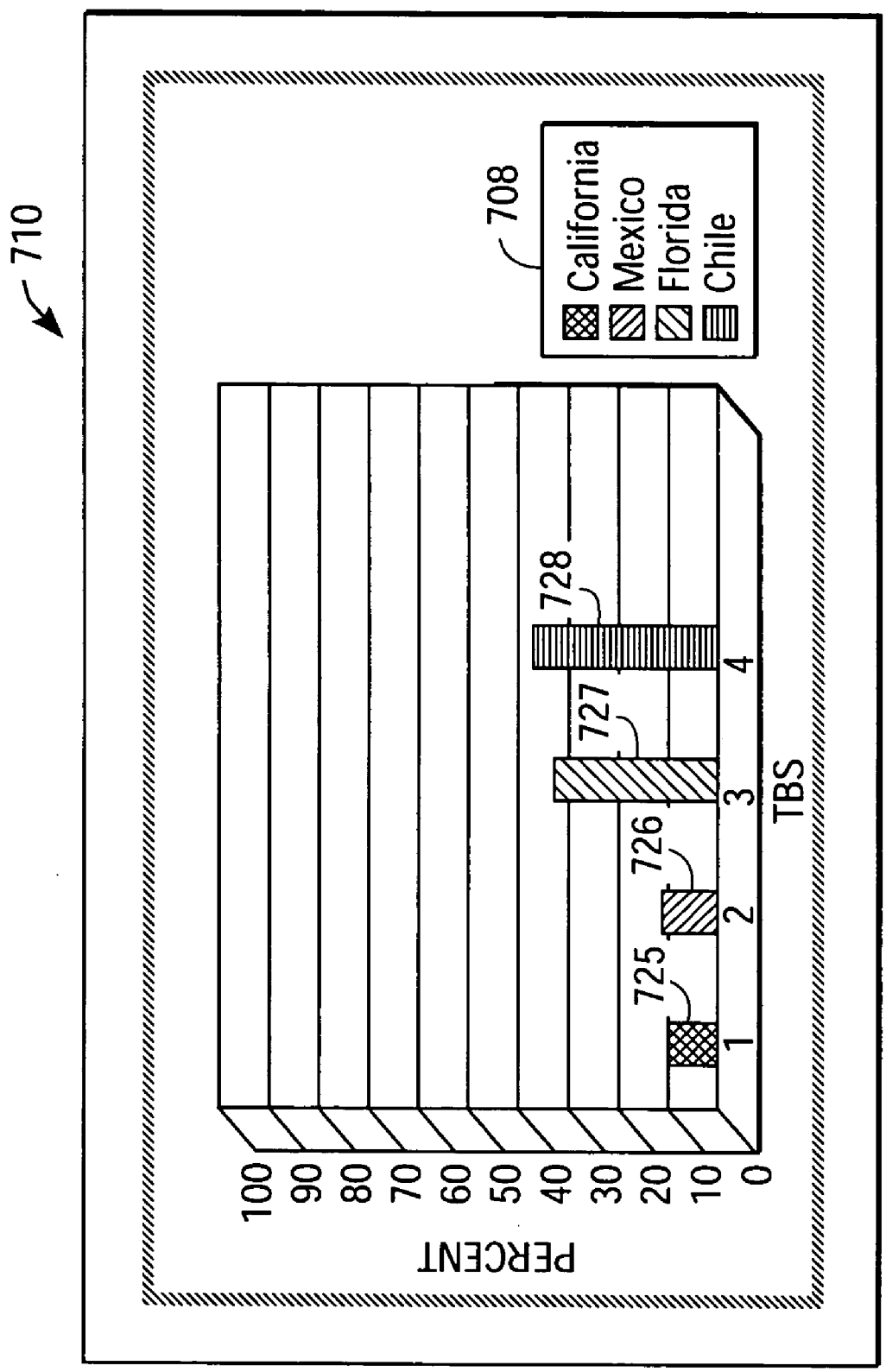
FIG. 7B illustrates an updated graphical presentation after data extraction according to one embodiment of the present invention.

FIG. 7B illustrates an updated graphical presentation and corresponding datasheet of FIG. 7A created by a computer program after extracting specified data points from tabulated data according to one embodiment of the present invention. In this graphical presentation 710, the percentage data of the TBS purchasing oranges from California, Mexico, Florida, and Chile in the past six months has changed. Lines 725-728 represent the changed data. In FIG. 7B, 10% of the TBS purchased oranges from California, 11% purchased oranges from Mexico, 33% purchased oranges from Florida, and 37% purchased oranges from Chile within the past six-months. This new data was extracted from tabulated data and inserted into the datasheet in the manner described above.

Figure 8:
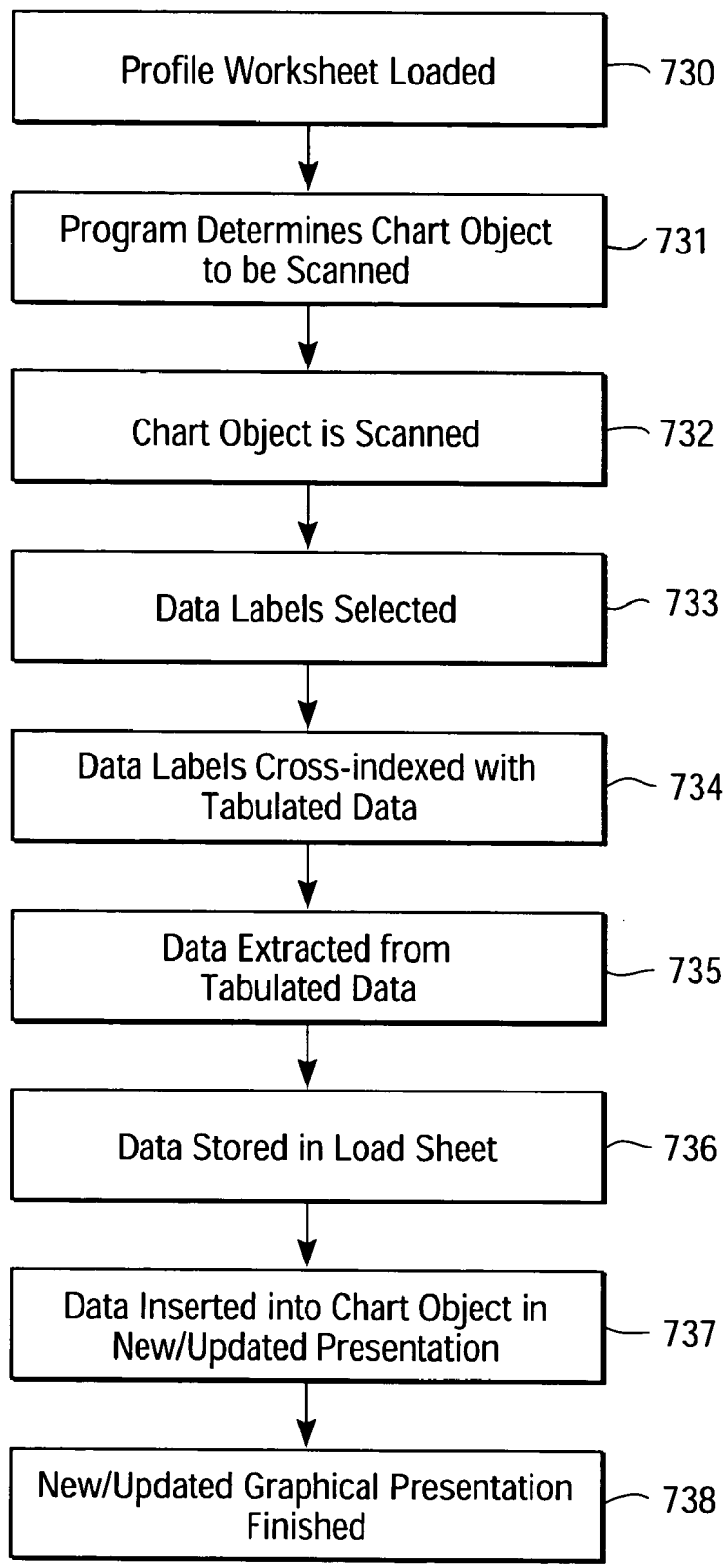
FIG. 8 is a flow chart that shows steps utilized by a computer program in accordance with one embodiment of the present invention.

FIG. 8 is a flow chart that shows the steps of scanning a first chart object to obtain specified data points utilized by a computer program to update the chart object according to one embodiment of the present invention. First, a specific profile worksheet completed by the user and then loaded into the application (block 730). Next, an executing algorithm determines which chart objects to scan based on information contained in the specific profile worksheet (block 731). The chart object is scanned (block 732) and data labels are selected (block 733) and stored in multidimensional, dynamic array structures. The algorithm then selects the proper tables and compares the arrays with data in the main tabulation (734). When specific labels from the datasheet have been located in the tabs the labels are cross-indexed, the resulting data is pulled (Block 735) and stored in an interim sheet in the tab file called the "load" sheet (Block 736). The algorithm has special features that allow it to determine if the labels in the datasheet banner (top row) are also located in the banner (top row) in the data tables—or if they are located in the table stubs. This feature is included since the PowerPoint datasheet may be transposed when compared to the data in the tabs.

Additionally, the application may have a number of formatting features built into it. By way of example, one such feature is a ranking manager that allows data points to be sorted as necessary, as they are stored in the load sheet (block 736). The load sheet may comprise an additional worksheet located in the file containing the tabulated data Excel™ program. This data in the load sheet is then used to populate the designated chart object in the PowerPoint presentation (block 737). An updated graphical presentation reflecting the updated, extracted data is thus created using the format of an old PowerPoint presentation (or a newly prepared "shell" of a PowerPoint presentation) as a model (block 738). In this way a new or updated PowerPoint presentation can be created rapidly and with a minimum of effort.

Figure 9A:
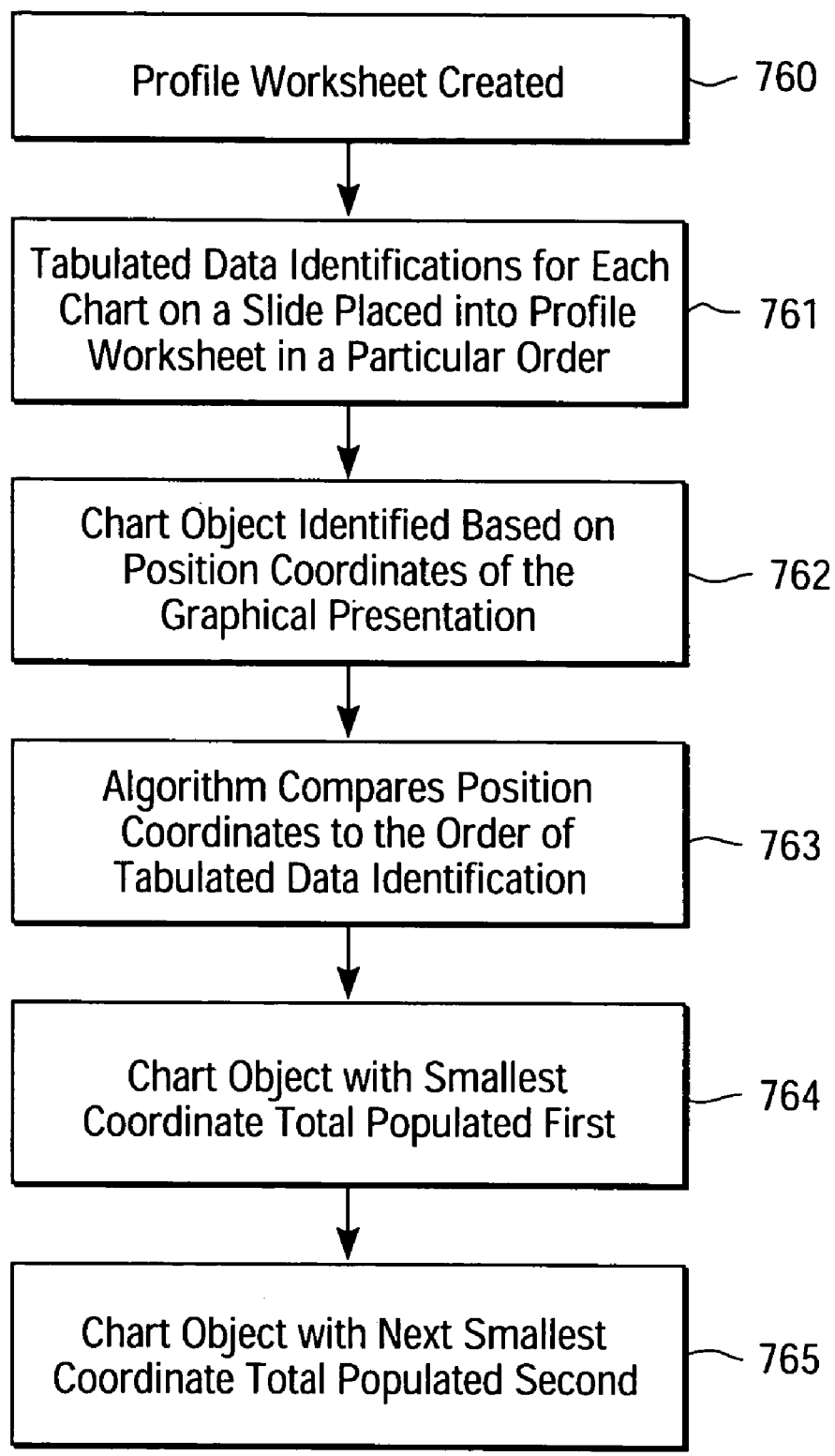
FIG. 9A is a flow chart that shows steps utilized by a computer program in accordance with one embodiment of the present invention.
Figure 9B:
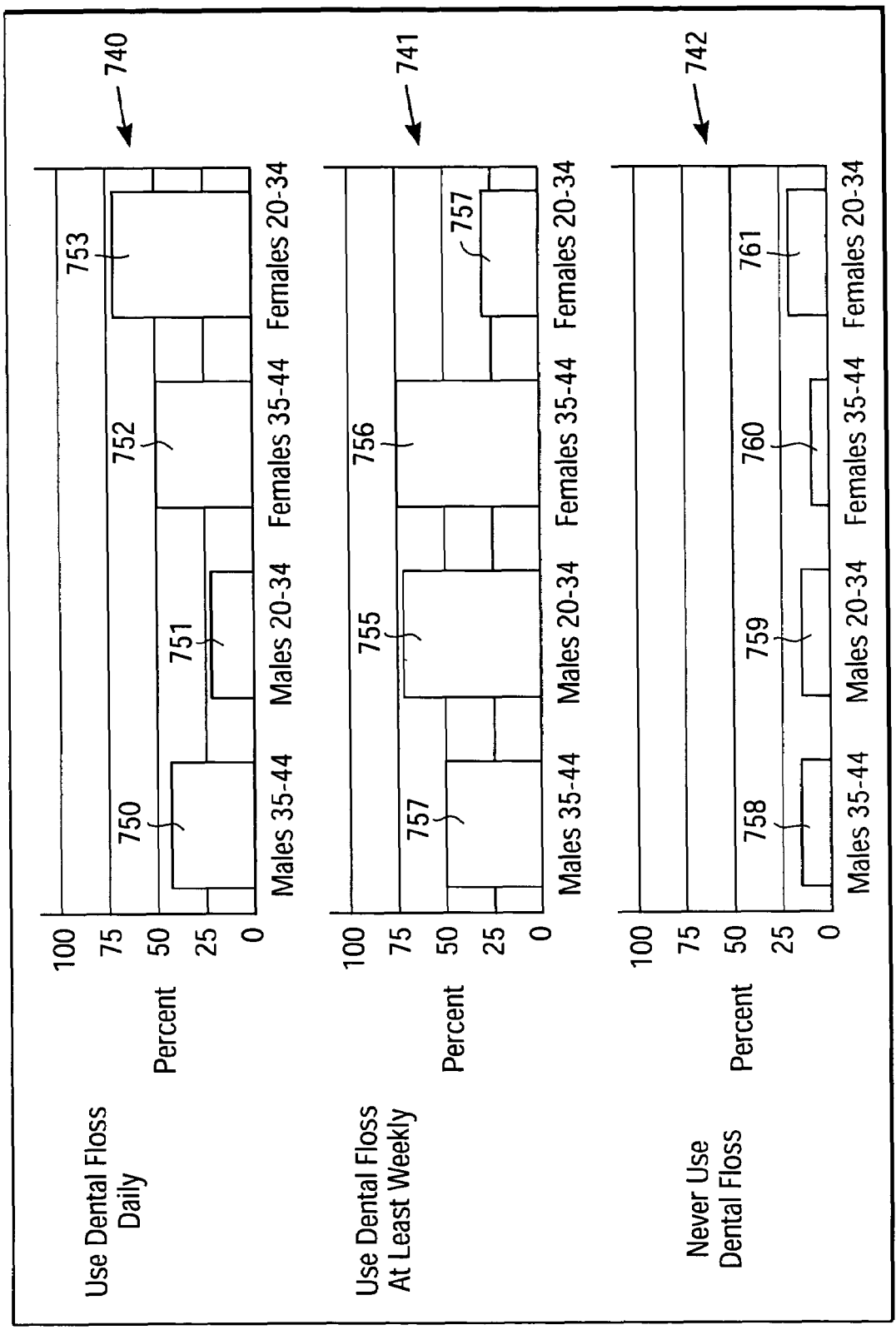
FIG. 9B illustrates multiple graphical presentations according to one embodiment of the present invention.

The application allows for many special cases. One is when a PowerPoint slide contains more than one chart object. FIG. 9A is a flow chart that shows the steps of scanning chart objects from a slide containing multiple chart objects upon each of which the above described process needs to be carried out, in accordance with one embodiment of the present invention. Often times, chart object are located on a single slide, such as on a single slide in PowerPoint™ as is illustrated by FIG. 9B. To populate these chart objects 740-742, the slide 744 is scanned and data labels taken from each of the charts' datasheets in turn. Data points extracted from the chart objects 740-742 are then correlated with their corresponding location in the tabulated data by referencing a profile worksheet in the manner described herein.

According to another embodiment of the present invention, an algorithm is utilized when multiple chart objects appear on a single slide to ensure that data extracted from the tabulated data is inserted into the correct graphical presentation regardless of the order in which the graphical presentation is actually chosen by the computer scan. First, a profile worksheet is created specifying which chart object (among one or more chart objects located on a single slide) is correlated to a particular tabulated data (block 760). This information is placed into the profile worksheet in the order that the chart objects appear in the slide (in this case 740, 741, 742 using the left to right and then top to bottom selection criteria).

The computer scan may, for example, identify 741 first, 742 second and 740 third. In fact, the computer scan is performed randomly. Therefore a special algorithm is included to ensure that the data selected from the tabs first (740) actually goes to the chart object selected first (741). So, rather than making the user specify a particular table and a particular graphical presentation by name and/or number, each graphical presentation is identified by the algorithm based on the position coordinates of the chart object as it is located on the slide (block 762). For example, the algorithm may determine that it has chosen graphical presentation 741 in FIG. 9B by adding up the distance of the graphical presentation from the left hand side of the screen and the distance from the top of the screen. By measuring and evaluating the coordinate totals of each graphical presentation on a slide, the algorithm is able to determine in the same way that the user did (by evaluating each chart based on its coordinates according to the left-right, top-bottom decision rule) which chart object is first. The algorithm is then able to ensure that the proper data extraction goes to the correct chart object even though the chart objects were scanned in a random order on the slide, by altering the order of the instructions in the Profile.

The algorithm compares the position coordinates of each chart object to the order in which the tabulated data identifications were placed in the profile worksheet (block 763). Each chart object is compared to each other and assigned a weight based on the relative size of the sum total of its coordinates. Each row in the profile question list for these charts is then re-ordered based on this weight as well as the order in which the chart object was selected by the computer. In this manner, the chart object with the smallest coordinate total is extracted and populated based on the tabulated data identified in the first row of the profile worksheet (block 764) no matter in what order the chart objects come up. The chart object with the next smallest coordinate total is populated by the data points extracted from the tabulated data identified in the second row of the profile worksheet (block 765), and so on, for the remainder of the chart object (s) located on the slide.

Referring now to FIG. 10 there is shown a profile worksheet with file paths according to one embodiment of the present invention. In order for the correct data from the tabulated data to be entered into the proper chart object, a user first enters information into the profile worksheet 800. In addition to correlating tabulated data to a chart object, the profile worksheet also contains other information relevant to populating the chart object. A user enters the Profile Name/Path 801 for a profile workbook, the Question List Sheet Name 802 (See FIG. 11), and the Banner Profile Sheet Name 803 (See FIG. 12), so that the algorithm can determine where to find this information when scanning through Excel™ or another similar program.

Figure 11:
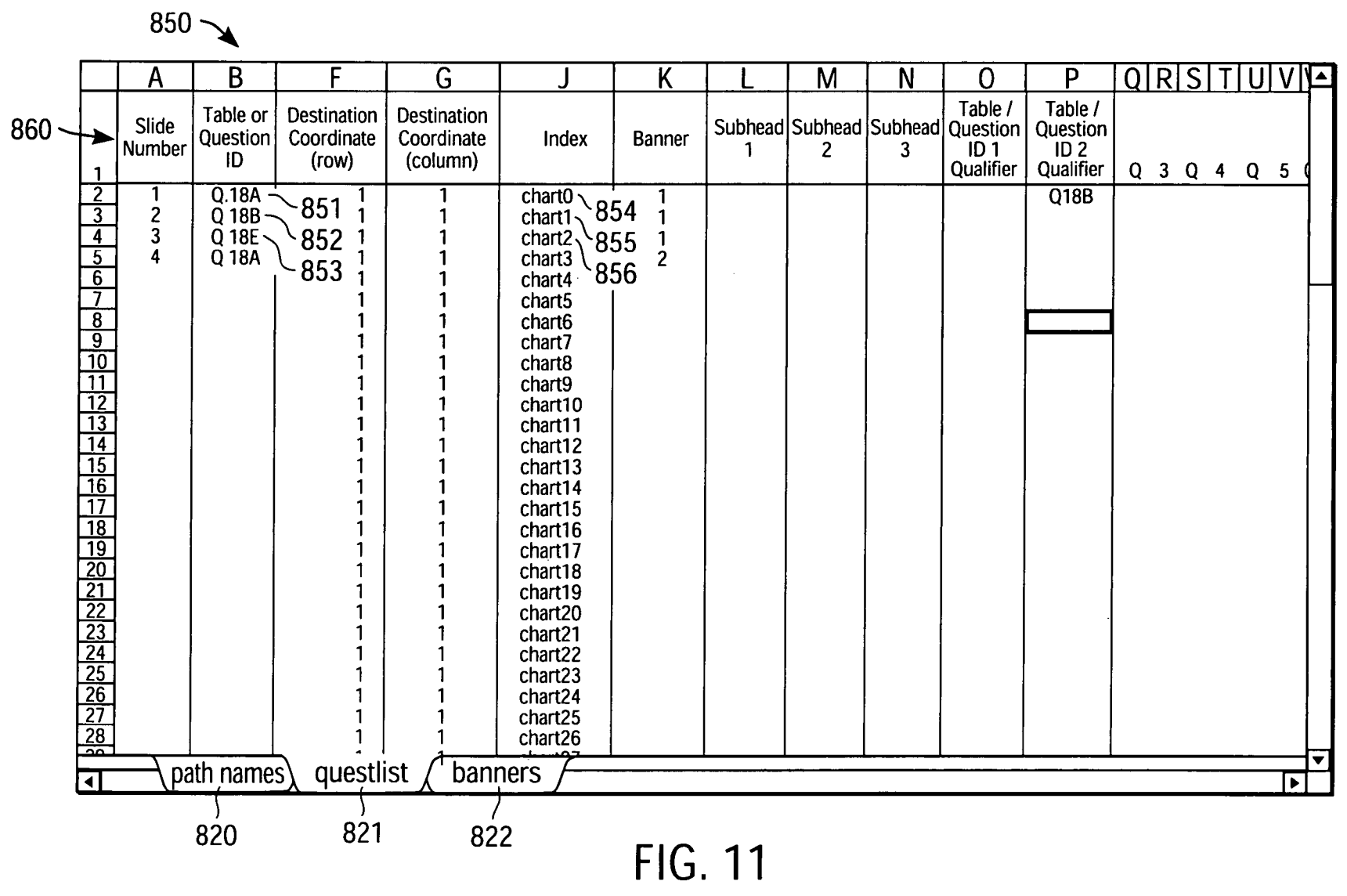

The Question List Sheet Name 802 correlates chart objects with tabulated data, as well as instructs the algorithm to enter additional information into the graphical presentations, as described in more detail in FIG. 11 herein. The Banner Profile Sheet Name 803 points the algorithm to particular banner headings from the tabulated data as a way of ensuring that the correct data is being extracted (e.g., the same question in the tabs can have more than one table, each with a different set of banner headings).

A user may enter a Tabulated Date File Name/Path 804 to specify the Excel™ file (or similar program file) that holds the tabulated data, a Tabulated Data Sheet Name 805 to specify the particular sheet in the tabulated data file that holds the tabulated data, a Tab Pre-Load Sheet Name 806 specifying the name of an interim space to hold extracted tabulated data spread sheets (as is described in FIG. 7), and a Tab Load Sheet Name 807 specifying the name of an interim space to hold extracted tabulated data points (as is also described in FIG. 7).

A user may also enter a Length of Tabs (# of Rows) 808 in a particular tabulated data sheet, which essentially specifies the number of rows in a particular set of tabs. A user may also enter a Next Table Marker 809 that indicates the first letter(s) of the first line of the title of the tabulated data, and a Last Table Title Marker 810 indicating the first letter(s) of the last line of the title of the tabulated data. In addition, a user may enter a Column 811 of the spreadsheet that the Last Table Title Marker 810 occurs in. This information is utilized by the algorithm to identify the correct tables in the tabulated data.

A user may also specify the program where the chart object is located. In the example shown, the profile work sheet 800 has spaces or fields for the PowerPoint™ Report File Name/Path 812, an SPSS Data File Name/Path 813 (should a user want to automate the tabulations, run them, and then export the data tables back to a program, such as Excel, as is described in FIG. 2), and a Word Report File Name/Path 814, in the event that the data points are to be extracted from tabulated data and inserted into a Microsoft Word™ file.

As is shown in FIG. 10, blocks 817, 818, and 819, contain a user's input for the profile. Blocks 818 and 819 remain unpopulated by data because this profile worksheet 800 involves extracting data points from tabulated data and inserting the data points into a PowerPoint™ graphical presentation.

At the base of the profile worksheet 800, a user may click on the particular sheet of the profile worksheet 800 that the user wants to input information into. In the embodiment described, the user has selected Pathnames 820 and the profile worksheet 800 with file paths is shown. A user may select Quest list 821, which is a profile worksheet used to match chart objects in a chart object with table and/or question identifications stored in tabulated data. A user may also select Banners 822, which is a profile worksheet used to specify changes to be made to banner headings taken from tabulated data and inserted into a chart object.

Referring now to FIG. 11 there is shown a worksheet 850 matching the slide number in a presentation with table and/or question identifications stored in tabulated data according to one embodiment of the present invention. In the worksheet of FIG. 11, question 18A is the unique ID for a table in a tabulated data file in Excel™ that instructs the executing algorithm to correlate the data labels for chart object 0 (i.e., chart 0) in slide 1 with the data points in table 18A. The table or question IDs may be entered sequentially 851, 852, 853, etc., under the banner heading "Table or Question ID", and correlated with the graphical presentation numbers 854, 855, 856, etc., also entered sequentially under the banner heading "Index." The PowerPoint™ slide numbers 1, 2, 3, 4, etc., may also be entered sequentially on the profile worksheet 800 under the banner heading "Slide Number." Banner headings 860 appear at the top of the profile worksheet 850.

There are also two headings in the profile entitled "Destination Coordinates." Essentially, the algorithm scans tabulated data for data points. These data points are extracted from the tabulated data and placed in an interim space, such as the load sheet. Then, the data is taken from the load sheet and used to populate a datasheet (see FIG. 7) underlying a chart object in a program such as PowerPoint™. The "Destination Coordinates" specify the row number and column number on the datasheet where the program should start inserting the extracted data points. There is also a banner heading for "Subhead 1," "Subhead 2," and "Subhead 3." A user may enter a subheading name for a given tabulated data file/question identification.

Finally, there is a banner heading entitled "Table/Question ID Qualifier." A user may enter a Table/Question ID qualifier when the banner heading or row label listed in a chart object's datasheet is different from those in the tabulated data as already discussed herein. For example, the PowerPoint datasheet at 7A may include a year or quarter in the case of time-series data, rather than the "Total" heading.

Referring now to FIG. 12 there is shown a profile worksheet specifying changes to be made to banner headings taken from tabulated data and inserted into a graphical presentation according to one embodiment of the present invention. In some instances, banner headings in tabulated data appear differently than how a user would like the banner headings to appear in the graphical presentation.

Additionally, in many cases, the banners in the tabulated data appear in multiple rows in the Excel file, which can be very difficult for the computer to pick up. In one embodiment of the present invention, a user may specify in the profile worksheet 870 changes to be made to the banner headings as they appear in the tabulated data. For example, in the profile worksheet 870 illustrated by FIG. 12, a Banner 1 heading 871 as it appears in the tabulated data is "all Respondents" 873. The corresponding Banner 1 heading 872 as it appears when the data points are populated in the graphical presentation will also be "Total" 874. Banner 1 headings 875, 876, etc., as they appear in the tabulated data and corresponding Banner 1 headings 877, 878, etc., as they appear when the chart object is populated will remain unchanged. Of course, it is be possible to change the banner heading "All Respondents" 873 to "Total Base" in the graphical presentation or to any other banner heading so long as this is specified in the profile worksheet 870. An example of a banner heading as it appears in a graphical presentation is Total 706 in FIG. 7A. FIG. 12 shows that the Banners 822 portion of the profile has been selected.

The application program of the present invention also facilitates working with the profile sheet by adding several areas of functionality contained in the Set-up Menu. For example, there is a New Profile Set-up Wizard that helps users set up a profile for a new project by prompting them for basic information such as file paths. The information input into the wizard is then inserted into a profile template that is distributed with the application and the profile is then saved in a location that the user specifies. Also, the application allows you to insert and un-insert rows in the Slide Specifications sheet of the profile in the event that the user adds or deletes slides in the middle of a presentation. The user may also reset the load and pre-load sheets (that is, delete all data contained therein) in the event that they wish to re-run an extraction based on an updated profile sheet. Finally, a user is able to manually normalize a profile (reorder the chart objects in the Slide Specification sheet according to their natural rank order) in the unlikely event that a profile has become corrupted.

Figure 13:
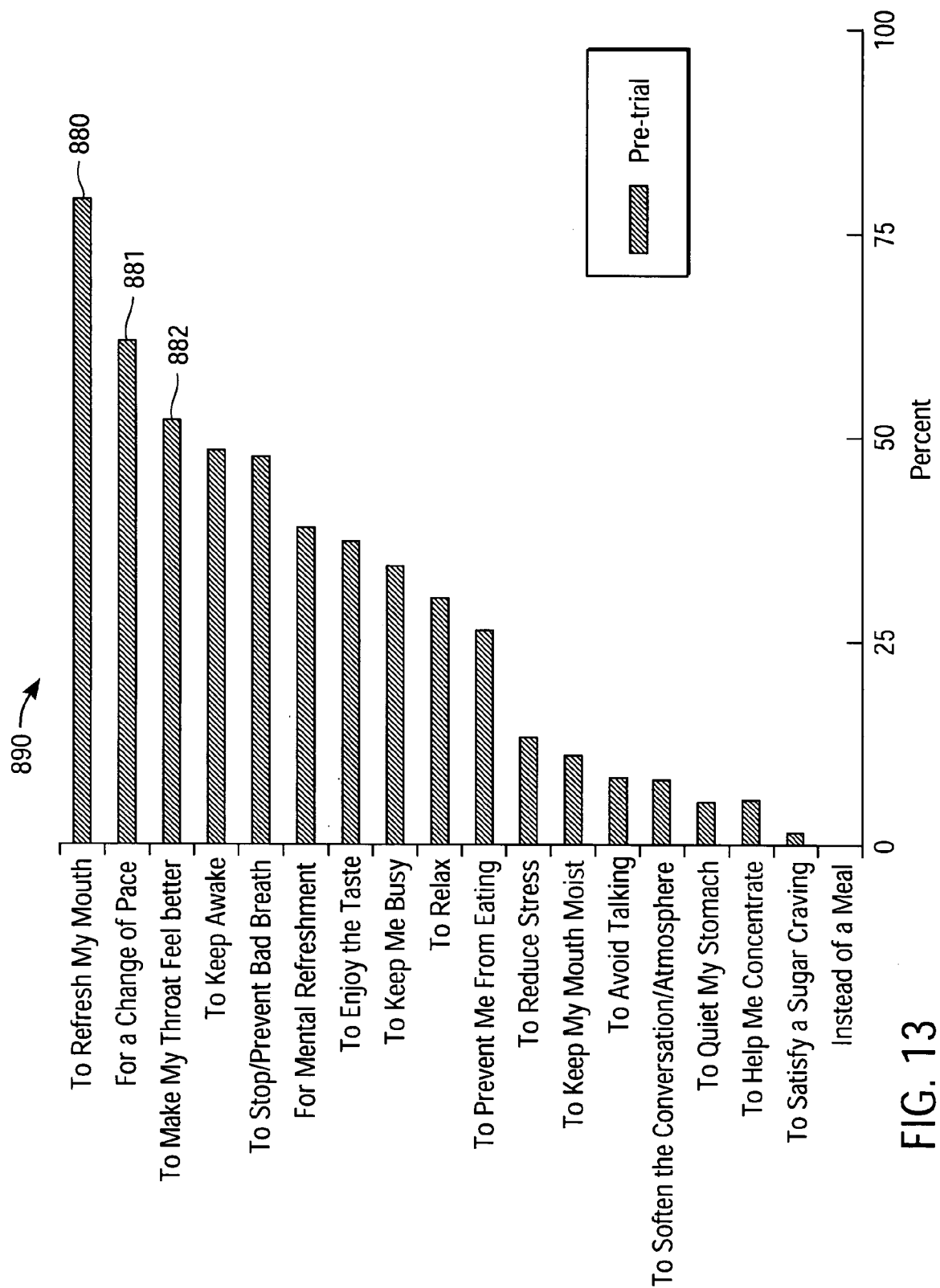
FIG. 13 is a graphical presentation created in accordance with one embodiment of the present invention.

Referring now to FIG. 13 there is shown a single chart object created by extracting data from multiple tables according to one embodiment of the present invention. The data points 880, 881, 882, etc., represented in the graphical presentation 890 have been extracted from 18 separate tables (not shown in this view), one table for each attribute.

In order to pull data points from multiple tables, the graphical presentation 890 is correlated with multiple table identifications, instead of one table identification, in a profile worksheet. In this case, for each data point in the chart object the profile worksheet specifies which table to extract the data from. In FIG. 11, this second ID is found in column P for slide 1.

Figure 14A:
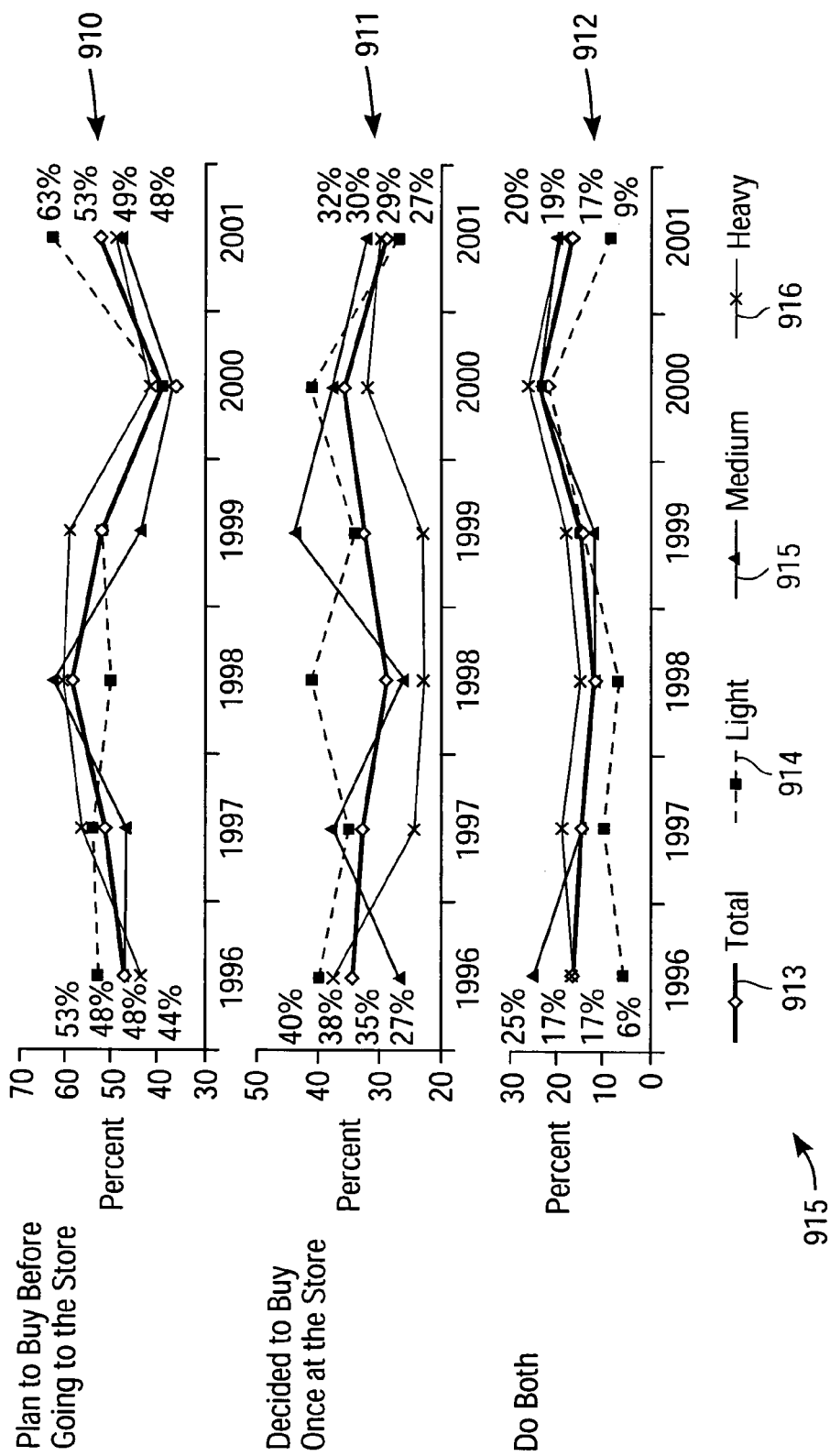
FIG. 14A is a graphical presentation with time series data according to one embodiment of the present invention.

Referring now to FIG. 14A there is shown a timeline graphical presentation created by extracting data from tabulated data according to one embodiment of the present invention. The graphical presentation of FIG. 14A illustrates time series data representing planned versus impulse purchases for oranges for the years 1996 to 2001. As is shown in this embodiment, there are multiple chart objects 910-912 located on a single slide 915, each graphical presentation representing the percentage data for planned versus impulse purchases of oranges for the years designated on the slide 915. Chart object 910 represents the percentage data for individuals who plan to buy oranges before going to the store. Chart object 911 represents the percentage data for individuals who decide to buy oranges once they are at the store. Chart object 912 represents the percentage data for individuals who sometimes plan to buy oranges when they go to the store and who also sometimes decide to buy oranges based on impulse once they are at the store. The differing format of lines 913-916 represent types of orange usage for the individuals surveyed. The solid lines with the diamonds represent the "total" population surveyed, the dashed lines with the squares represent "light" orange users, the solid lines with the triangles represent "medium" orange users, and the solid lines with the "x" symbol represent "heavy" orange users.

To populate these chart objects 910-912 with new data points for percentage data for planned versus impulse purchases of oranges for the year 2002, the algorithm would scan and then select the labels "total," "light," "medium," etc. from the chart objects. These data points are extracted from the tabulated data specified in the profile worksheet and inserted into the graphical presentations 910-912 according to the algorithm for inserting data points into multiple graphical presentations located on a single slide described in FIG. 9A herein. Because there is no data label for the year 2002 located in the chart objects 910-912, the algorithm needs to know how to insert the year 2002 for the new data at the base of slide containing chart objects 910-912.

To perform this task, the algorithm turns to the profile worksheet (not shown in this view) which has a space where a user may enter time series qualifiers (i.e., banner headings) in addition to all the other information that may be entered into the profile worksheet. This allows the algorithm to insert 2002 when it inserts the data points into the chart objects 910-912. The profile worksheet also specifies the destination coordinates on the datasheets corresponding to chart objects 910-912 where the program should start inserting the extracted data points. In this manner, the algorithm is able to insert the year 2002 data points without inadvertently inserting the data points over the existing data.

Figure 14B:
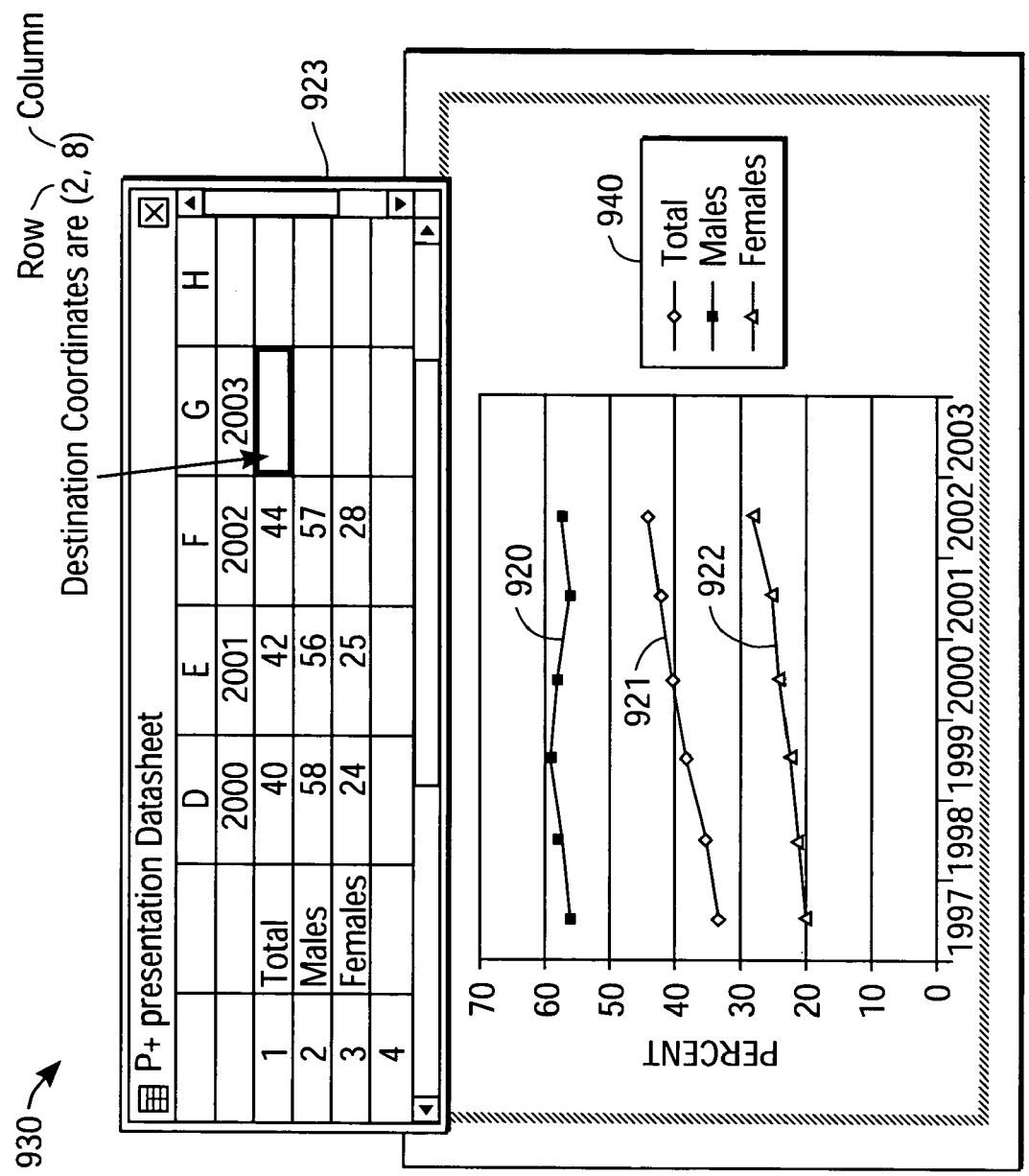
FIG. 14B is a graphical presentation with time series data created according to one embodiment of the present invention.

Referring now to FIG. 14B there is shown a time series chart object including a datasheet created by extracting data from tabulated data according to one embodiment of the present invention. The labels Total, Males and Females are represented by lines 920-922. Time series data for the year 2003 has not yet been extracted from tabulated data. Corresponding datasheet 923 indicates the data points that have populated the chart object 930 for prior years 2000-2002. The new data points extracted for the tabulated data for the year 2003 are inserted into the datasheet 923, as determined by the destination coordinates specified in the profile worksheet for this particular graphical presentation. The destination coordinates on the profile worksheet instruct the algorithm to start inserting the data points beginning in Row 2 and Column 8 of the datasheet 923. Block 940 indicates that the Total is represented by line 921, that the Males are represented by line 920, and that the Females are represented by line 922.

The time series qualifier (i.e., the banner heading) is inserted as a label in the datasheet 923. Note that the "2003" proxy label is inserted as a label in this example, rather than a stub from the tables. Also note that the application has a built in function to determine whether or not to insert the 2003 label in row 1, column 8 as shown or alternately in row 8, column 1 depending on the shape of the data. In an alternative embodiment the application may support drawing from multiple tables to the same chart if subheadings or time series data also exists.

Another special case that the application can handle is subheadings in the tabulated data, as shown in FIG. 19. In this case, a table contains the same stubs (Top 2 Box" and "Bottom 2 Box") under both subheadings ("Product P" and "Product Q"). The application allows the user to specify which of the two "Top 2 Box" stubs will be pulled by the application by placing proxy labels in the datasheet, the stub name as a qualifier in the profile and the subheading(s) as labels in the Subhead columns of the profile Question List sheet, as depicted in FIG. 11.

Figure 15:
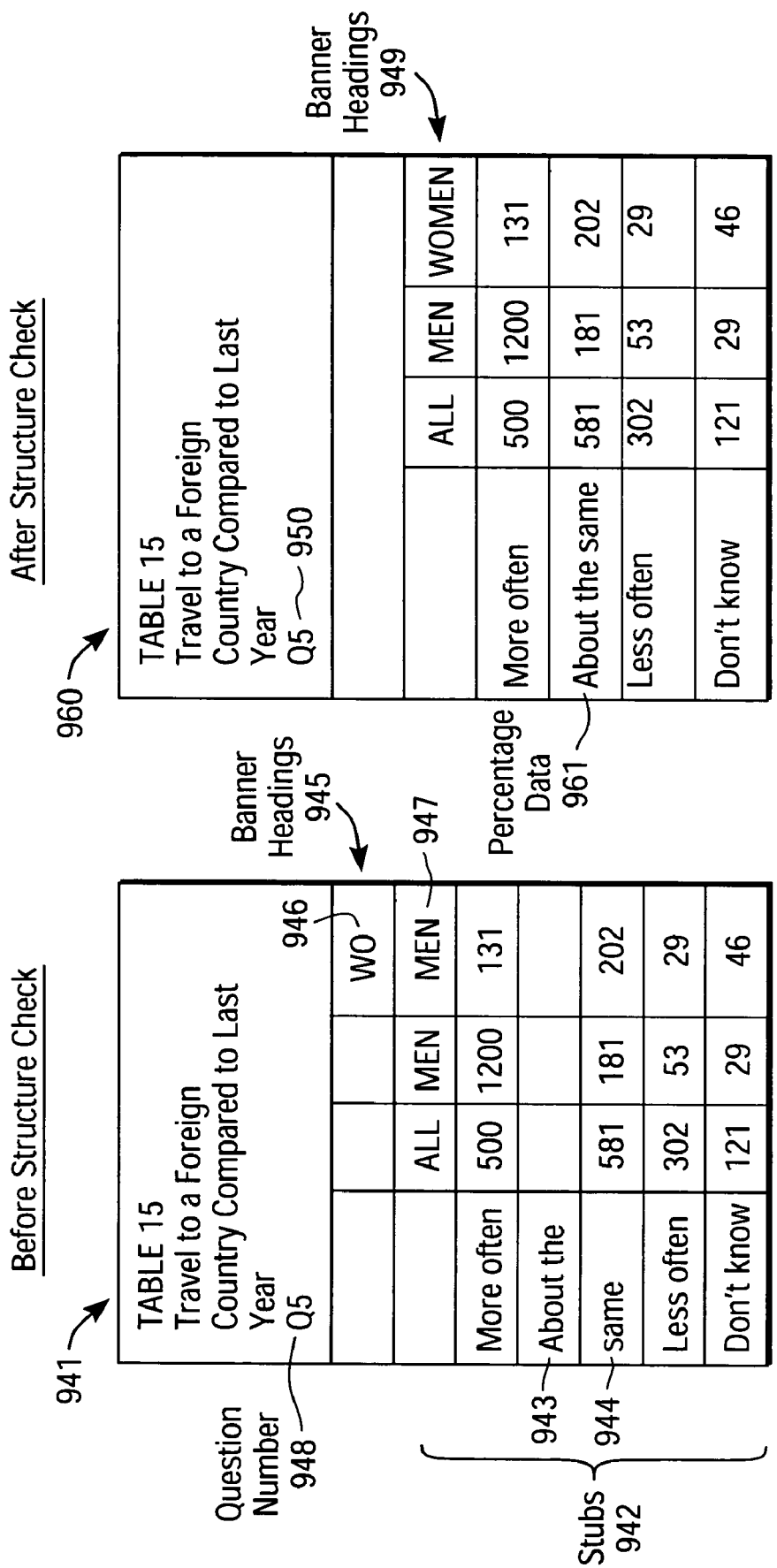
FIG. 15 shows tabulated data before and after formatting to one embodiment of the method present invention.

Referring now to FIG. 15 there is shown tabulated data before and after formatting with a tab structure repair module according to one embodiment of the present invention. Often tabulated data is not formatted in such a way that the application can easily read it. For example, tabulated data before a structure check 941 may have stub headings 942 broken into two rows 943 and 944, banner headings 945 split into two rows 946 and 947, no space between a question identification 948 and banner headings 945 and other formatting problems that make it problematic for the data points to be effectively scanned.

A tab structure repair module allows these formatting problems to be corrected before the tabulated data is scanned for the relevant data points. The tab structure repair module checks the tabulated data according to a set of pre-defined rules written in software code such as Java, Visual Basic, C++, or other types of programming languages. For example, the pre-defined rules could specify that banner headings 945 and 949 occupy a single row, that there be a single space between question identifications 948 and 950 and banner headings 945 and 949 and other types of formatting rules to ensure regularity in the formatting of the tabulated data.

As can be seen in the tabulated data after the structure repair 960, the stubs are now all in a single row 961, and the banner headings 949 are no longer broken into two rows; there are now single spaces between the question identification 950 and the banner headings 949. After the tab structure repair module corrects the format of the tabulated data, it scans the tabulated data for the data points and extracts the data to be inserted into one or more graphical presentations as is described herein.

Figure 17A:
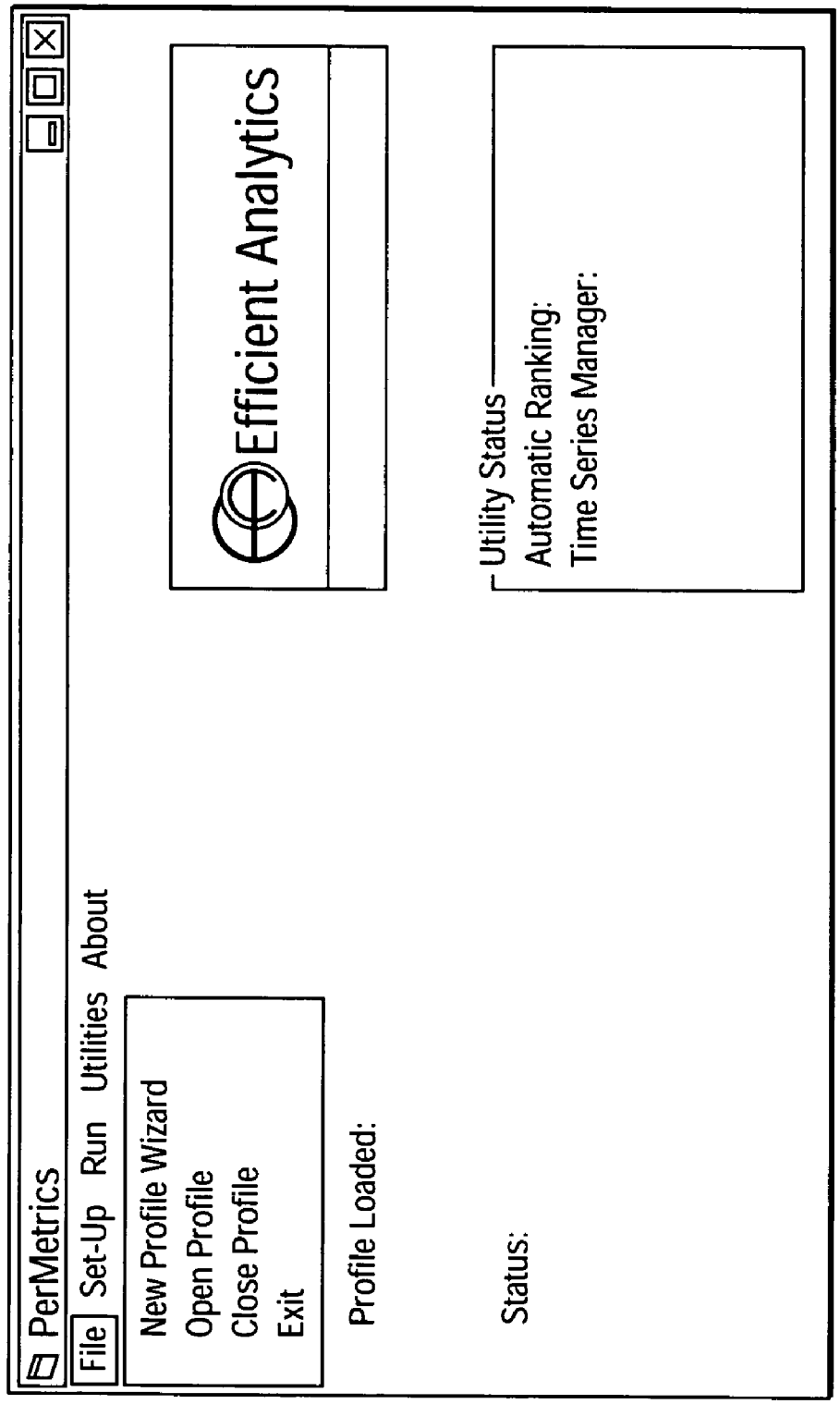
FIG. 17 shows a user interface according to one embodiment of the present invention.
Figure 17B:
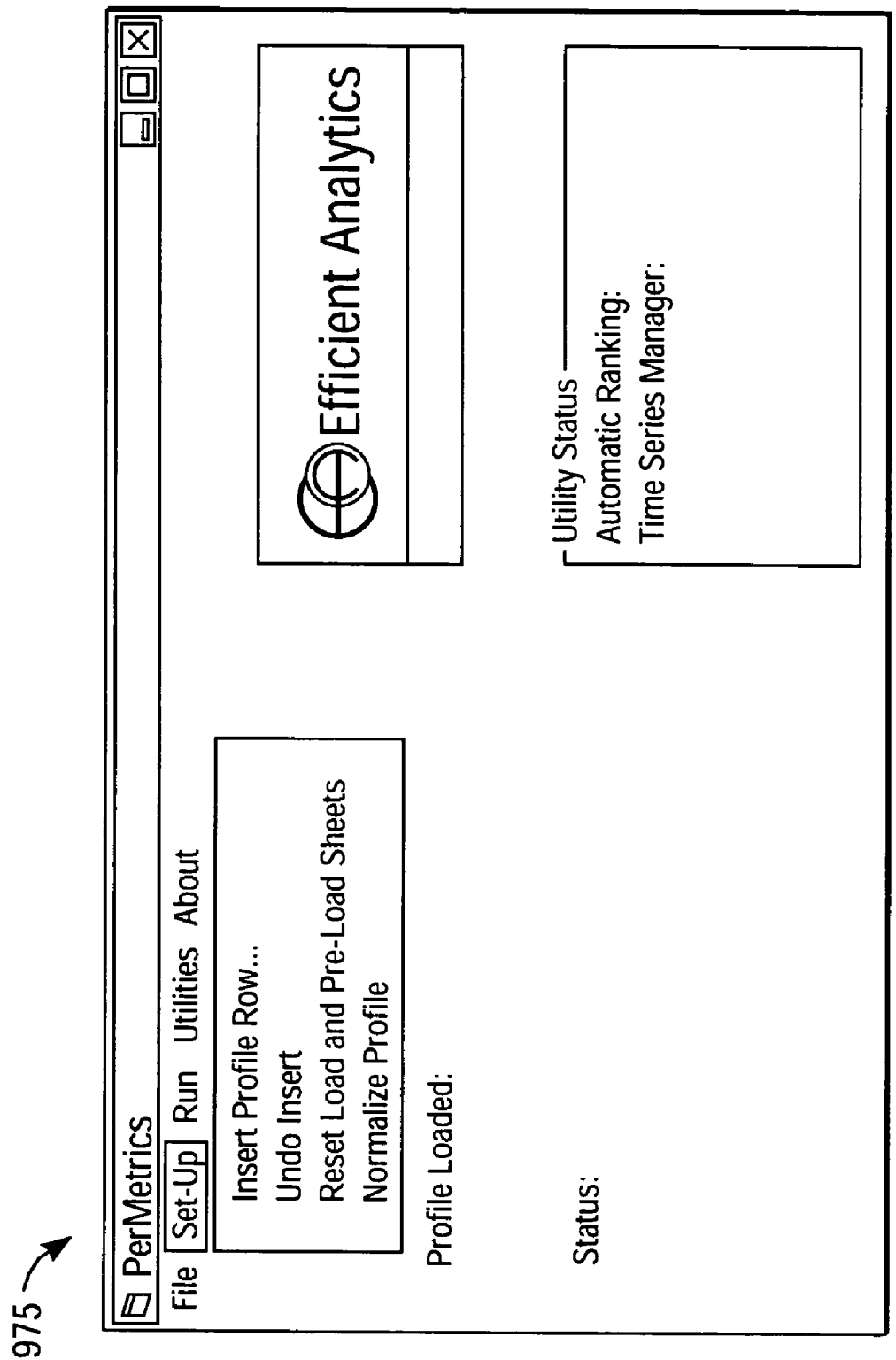
Figure 17C:
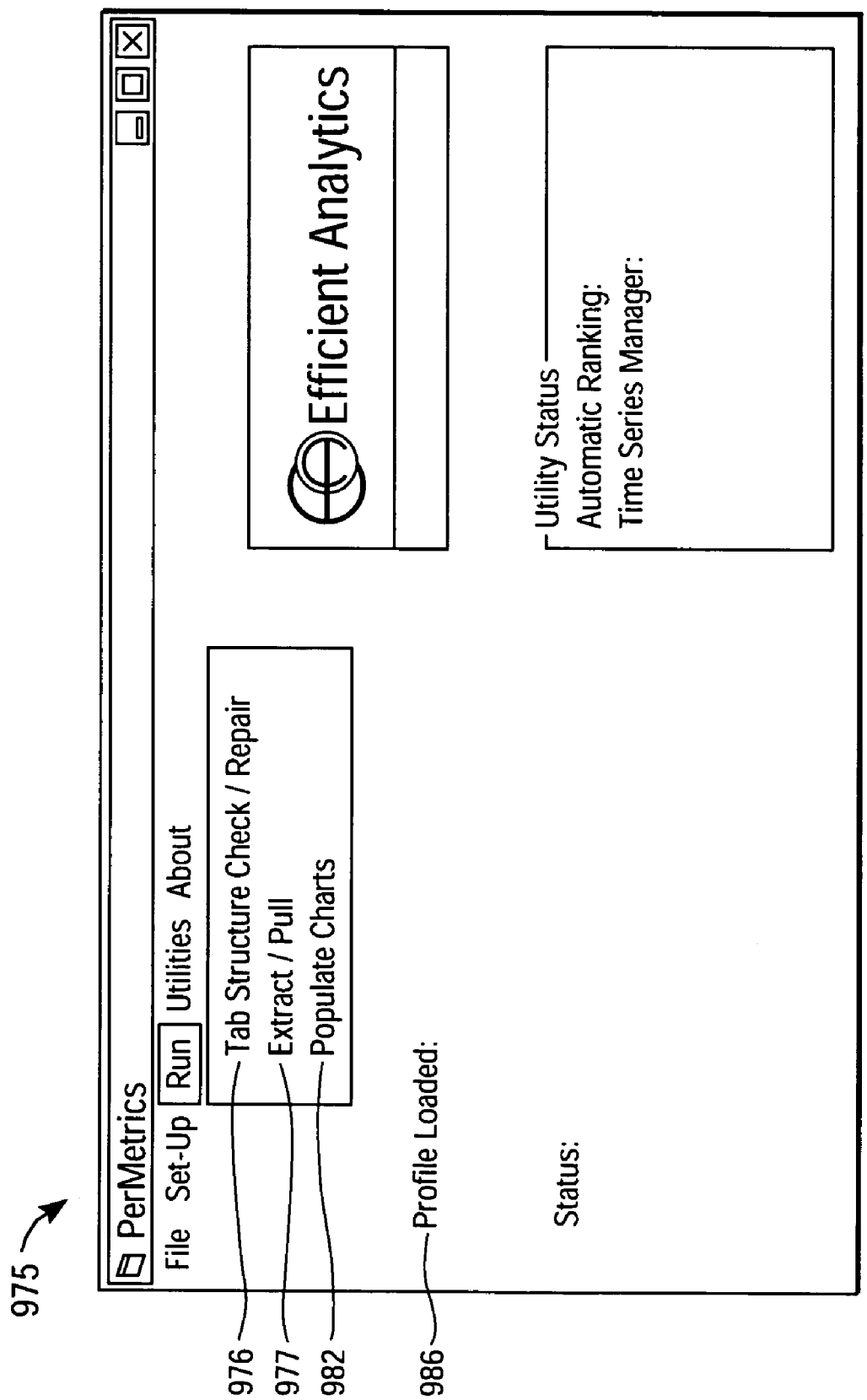
Figure 17D:
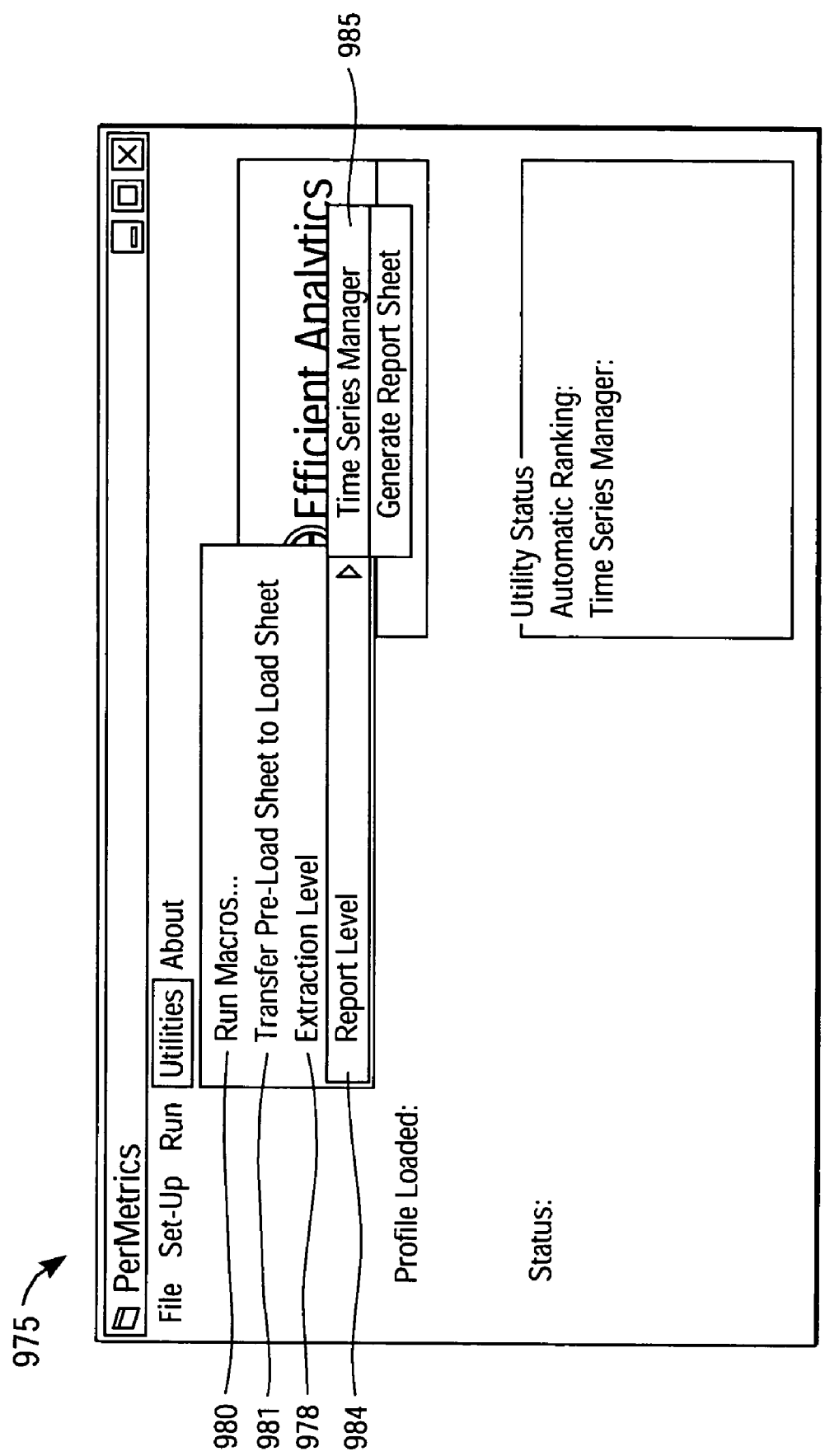
Figure 18:
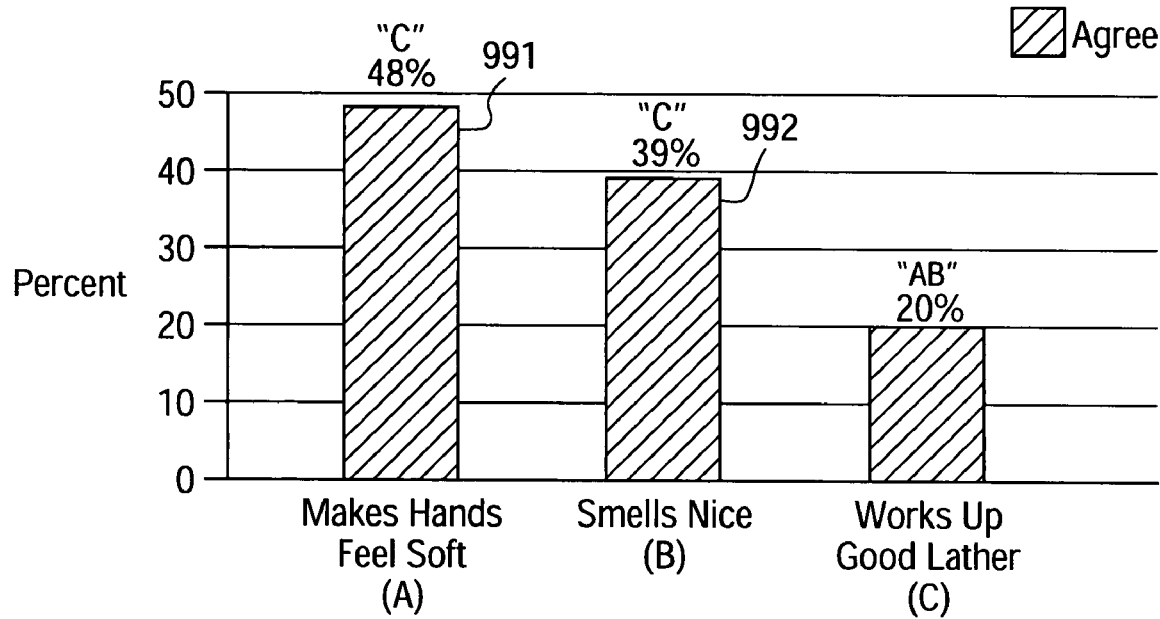
FIG. 18 shows a graphical presentation according to one embodiment of the present invention.

FIGS. 17A-D illustrates a user interface 975 having various pull-down menus according to one embodiment of the present invention. Utilizing user interface 975, a user can click on a Tab Structure Check/Repair module 976 to make sure that the tabulated data is formatted correctly. A user may also click on Extract module 977 to perform the method for extracting data points from tabulated data in the manner described herein. Ordinary utility programs may be used at the extraction level. In FIG. 17D, the Extraction Level module 978 may be selected to show a Ranking Manager module (not shown), the selection of which will instruct the computer to rank the data points at the extraction level, such that the data points will appear ranked in the load sheet. For example, the data points may be ranked from highest to lowest (i.e., the greatest percentage to the smallest percentage) and will thus populate the graphical presentation according to this ranking scheme. Of course, the data points may be ranked in virtually any manner in which a user chooses (i.e., alphabetically, lowest to highest, etc.).

During the extraction routine, if the application program cannot find the designated data points in the tabulated data, or if there are formatting issues in the tabulated data that it cannot correct with the Tab Structure Check, it pulls the entire data table in question into a preload sheet. Once in the preload sheet, the data points need human attention to be formatted correctly before the data points may be entered in a chart object. For example, logical operations may need to be performed, the data may need to be transposed or re-ordered or re-labeled, etc. This may be accomplished by the user recording macros using the Excel™ VBA (Visual Basic for Applications) facility. Once all the necessary macros are recorded (usually one per table/question concerned) they may be run together using the Run Macros module 980. The invention contains a third party application program interface (API) that allows the user to plug directly into Excel's macro dialog box. After the macros have been run, the data points are ready to be transferred to the load sheet for insertion into the graphical presentations. This may be accomplished using the Transfer PreLoad Sheet to Load Sheet module 981.

A Populate PowerPoint™ Charts module 981 may be utilized to populate the data points into the graphical presentation from the load sheet. In FIG. 17D, a Report Level module 984 is shown selected, bringing up a Time Series Manager 985 that allows the computer to implement a variety of formatting tasks at the graphical presentation level. In the embodiment illustrated by FIG. 17, a Profile Loaded status indicator 986 at the base of the user interface 975 indicates that a profile worksheet has been properly loaded onto the computer.

In addition to populating graphical presentations with data points extracted from tabulated data, the algorithm described herein may also incorporate additional features at both the extraction and data population stages such as the ranking manager or time series manager already discussed. These additional functionalities may include anything from simple macros to refine extracted data to sophisticated solutions to automate various general or client-specific tasks, such as adding significance testing to text boxes on the graphical presentations. The application is built in such a way that add-ins can be included with future releases of the product. These add-ins may typically be included under the Utilities menu. Add-ins could contain virtually any sort of functionality that a user specifies. They could be either production-level modules that a client turns on or off by paying for the functionality or they could be custom applications developed specifically for one client.

One example of such an add-in would be a data error checker. It is important that the proper data points be inserted into the proper graphical presentation without error. An error checker algorithm written in software code such as Java, Visual Basic, C++, or other types of programming languages may be utilized to ensure that proper data points are correctly inserted into the graphical presentations.

Figure 16:
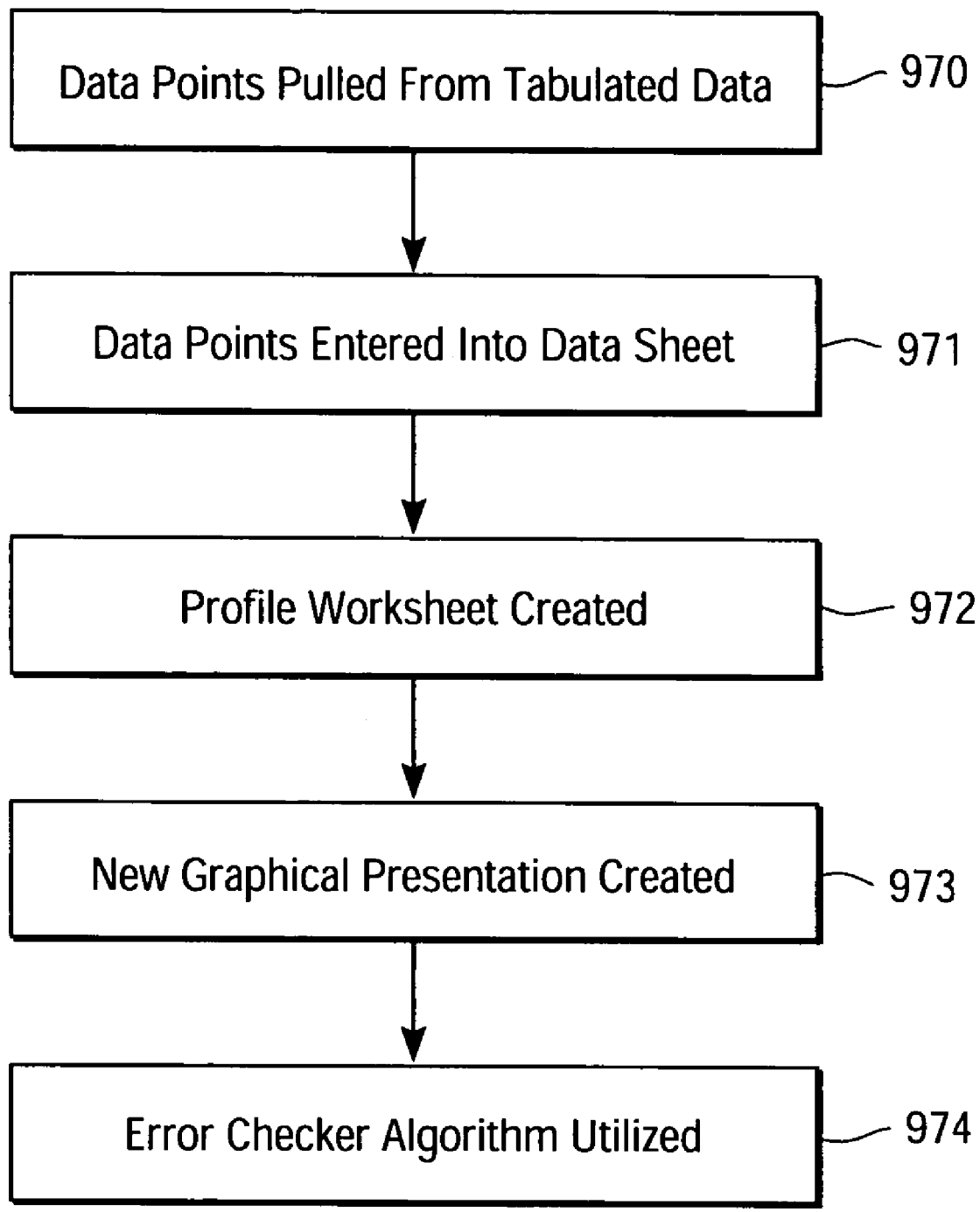
FIG. 16 is a flow chart that shows the steps of creating a graphical presentation according to another embodiment of the present invention.

FIG. 16 is a flow chart that shows the steps of creating a graphical presentation using a profile worksheet and an error checker according to one embodiment of the present invention. Data points are pulled from the tabulated data (block 970). The data points may either be pulled from tabulated data in a computer program such as Excel™ or extracted manually from a hard copy of tabulated data. The data points are entered into the datasheet, such as the datasheet in PowerPoint™ (block 971). The data points may be entered manually (via typing) or cut and paste from Excel™ or even from other programs such as tabulated data created in Microsoft Word™. Next, a profile worksheet is created to instruct the algorithm to match chart objects in a graphical presentation with table and/or question identifications (block 972). New data points are then extracted from the tabulated data and entered into the graphical presentation to create a new graphical presentation (block 973). The error checker algorithm may be utilized to ensure that the correct data points (i.e., chart objects) have been entered into the right graphical presentation (block 974).

Another example of an add-in is a utility that automatically labels bars in a bar chart according to whether or not figures in each bar are "significantly different" from one another. Significant differences are typically identified through a statistical procedure known as hypothesis testing. The idea is to determine if differences in measurements taken in a survey can be explained as being due to sampling error or if they are due to some other real effect. Typically, hypothesis testing is conducted automatically by the tabulation program and so the results are contained in the main data tabulation file. The add-in would automatically extract these results from the tabs and label the real differences in the PowerPoint slide.

One particularly useful add-in included in the application is the Report Shell Generator. As previously mentioned, the application requires a PowerPoint presentation containing the charts and data labels necessary to find tab data in order to run. In some cases, a presentation will already exist, for example for an advertising tracking study that has been run before. But in many cases, a study will be new or a 'one-off', and there will be no existing presentation. In this case the research analyst will need to prepare a presentation or report "shell" in advance. The application contains an algorithm to facilitate this. This functionality allows a user to simply specify a "shell file" using a template provided with the application. In that template the user includes all the charts s/he would like to include in the shell report. The template provides spaces not only for each chart object desired, but for a variety of other information as well, such as chart titles, base sizes, question labels, etc. The user can specify the titles and chart object s/he would like included on each slide in the profile workbook. In this way, a research analyst is able to create a shell or outline of the sorts of analyses s/he would like the report presentation to contain. The application then generates the actual report shell automatically, by spinning out the presentation slide by slide and adding labels, charts and titles as appropriate. This action is beneficial in two main ways: 1) it saves the research analyst time by relieving him/her of having to create and format all the charts by hand, and 2) it encourages the researcher to adhere to MR best practices by creating an analytical plan and report shell at an early stage of the research process (thereby helping to ensure that questions in the questionnaire will really provide data that supports analyses that are appropriate for the research objectives.)

It should be noted that each graphical presentation may be uploaded and made available for viewing on a HMTL page. Users may access the page from a web server through a network (e.g., the Internet) in a manner well known in the art. Furthermore, the software system described herein may be implemented in a variety of ways, including a desktop forwarding application. The software system may also be upgraded to an enterprise-level application that would reside on a server and be accessible by multiple client computers over a network. In this manner, multiple users could access the software via a Wide Area Network ("WAN"), a Local Area Network ("LAN"), or any other system of interconnections enabling two or more computers to exchange information. Network may include a wireless network, such that one or more computers may operate over a wireless LAN (WLAN).

Although the present invention has been described with reference to specific exemplary embodiments, it should be understood that numerous changes in the disclosed embodiments can be made in accordance with the disclosure herein without departing from the spirit and scope of the invention. The preceding description, therefore, is not meant to limit the scope of the invention. Rather, the scope of the invention is to be determined only by the appended claims and their equivalents.

I claim:

1. A system for performing a data extraction procedure to automatically populate a graphical presentation, comprising:
    at least one display device;
    at least one processing unit;
    data tables that are created by utilizing a tabulation program, said data tables including data values that are each associated with identification labels;
    a graphical presentation that is created by utilizing a graphing program to display selected ones of said data values and identification labels in a graphical format;
    an extraction worksheet that a system user creates to specify data selection information and data transfer information for performing said data extraction procedure; and
    an extraction program that references said extraction worksheet to automatically perform said data extraction procedure, said extraction program electronically scanning said graphical presentation to identify said selected ones of said data values and said identification labels in said graphical presentation, said extraction program then extracting current values for said selected ones of said data values and said identification labels from said data tables, said extraction program utilizing said current values to populate said graphical presentation, said extraction program being a separate set of software program instructions that are not implemented as a part of either said tabulation program or said graphing program, said extraction worksheet being implemented as an integral part of said extraction program, said system user utilizing a graphical user interface generated by said extraction program to specify said data selection information and said data transfer information in said extraction worksheet.

2. A system for performing a data extraction procedure to automatically populate a graphical presentation, comprising:
    at least one display device;
    at least one processing unit;

data tables that are created by utilizing a tabulation program, said data tables including data values that are each associated with identification labels;

a graphical presentation that is created by utilizing a graphing program to display selected ones of said data values and identification labels in a graphical format;

an extraction worksheet that a system user creates to specify data selection information and data transfer information for performing said data extraction procedure; and an extraction program that references said extraction worksheet to automatically perform said data extraction procedure, said extraction program electronically scanning said graphical presentation to identify said selected ones of said data values and said identification labels in said graphical presentation, said extraction program then extracting current values for said selected ones of said data values and said identification labels from said data tables, said extraction program utilizing said current values to populate said graphical presentation, said graphing program including a datasheet with graph values for said graphical presentation, said extraction worksheet being implemented as a separate entity that is different from said datasheet of said graphing program.

3. The system of claim 2 wherein said extraction worksheet is initially created by said system user, said extraction program then performing said data extraction procedure to extract said selected ones of said data values and said identification labels based upon specific data extraction instructions created in said extraction worksheet, said extraction program automatically populating said datasheet of said graphing program with said selected ones of said data values and said identification labels, said graphical presentation simultaneously being updated to correspond to said datasheet of said graphing program.

4. A system for performing a data extraction procedure to automatically populate a graphical presentation, comprising:

at least one display device;

at least one processing unit;

data tables that are created by utilizing a tabulation program, said data tables including data values that are each associated with identification labels;

a graphical presentation that is created by utilizing a graphing program to display selected ones of said data values and identification labels in a graphical format;

an extraction worksheet that a system user creates to specify data selection information and data transfer information for performing said data extraction procedure; and an extraction program that references said extraction worksheet to automatically perform said data extraction procedure, said extraction program electronically scanning said graphical presentation to identify said selected ones of said data values and said identification labels in said graphical presentation, said extraction program then extracting current values for said selected ones of said data values and said identification labels from said data tables, said extraction program utilizing said current values to populate said graphical presentation, said extraction worksheet including a pathname worksheet that said system user creates to automatically specify which of said selected ones of said data values and said identification labels are inserted into which chart object in said graphical presentation, said system user creating said pathname worksheet to automatically specify a profile name/path to identify a workbook file for a specific extraction procedure, a question list sheet to identify a list of individual tables from said data tables for said specific extraction procedure, a banner profile sheet name to identify a banner selection sheet for said specific extraction procedure, a tabulated data file name/path to identify selected ones of said data tables for said specific extraction procedure, and a tab load sheet name to identify a selected interim storage space extracted data from said specific extraction procedure.

5. A system for performing a data extraction procedure to automatically populate a graphical presentation, comprising:

at least one display device;

at least one processing unit;

data tables that are created by utilizing a tabulation program, said data tables including data values that are each associated with identification labels;

a graphical presentation that is created by utilizing a graphing program to display selected ones of said data values and identification labels in a graphical format;

an extraction worksheet that a system user creates to specify data selection information and data transfer information for performing said data extraction procedure; and an extraction program that references said extraction worksheet to automatically perform said data extraction procedure, said extraction program electronically scanning said graphical presentation to identify said selected ones of said data values and said identification labels in said graphical presentation, said extraction program then extracting current values for said selected ones of said data values and said identification labels from said data tables, said extraction program utilizing said current values to populate said graphical presentation, said extraction worksheet including a question list worksheet that said system user creates to instruct said extraction program to automatically match a specific slide of said graphical presentation with a specific one of said data tables and/or a specific question category from said data tables during said data extraction procedure.

6. The system of 5 wherein said system user creates said question list worksheet to automatically specify a destination slide from said graphical presentation for inserting extracted data in a specific extraction procedure, row and column destination coordinates in said destination slide for inserting said extracted data in said specific extraction procedure, table or question identifiers to specify either a specific one of said data tables or a specific question as a data source for extracting said data values during said specific extraction procedure, and a table/question ID qualifier that indicates when a banner heading or a row label in said destination slide is different from said specific one of said data tables.

7. A system for performing a data extraction procedure to automatically populate a graphical presentation, comprising:

at least one display device;

at least one processing unit;

data tables that are created by utilizing a tabulation program, said data tables including data values that are each associated with identification labels;

a graphical presentation that is created by utilizing a graphing program to display selected ones of said data values and identification labels in a graphical format;

an extraction worksheet that a system user creates to specify data selection information and data transfer information for performing said data extraction procedure; and an extraction program that references said extraction worksheet to automatically perform said data extraction procedure, said extraction program electronically scanning said graphical presentation to identify said selected ones of said data values and said identification labels in said graphical presentation, said extraction program then extracting current values for said selected ones of said data values and said identification labels from said data tables, said extraction program utilizing said current values to populate said graphical presentation, said extraction worksheet including a banner worksheet that said system user creates to instruct said extraction program to automatically associate specified data table banners from said data tables with specified graphical presentation banners from said graphical presentation, even though said specified data table banners and said specified graphical presentation banners are not identical.

8. The system of claim 7 wherein said banner worksheet causes said extraction program to automatically change said specified data table banners from said data tables into said specified graphical presentation banners from said graphical presentation based upon instructions in said banner worksheet.

9. A system for performing a data extraction procedure to automatically populate a graphical presentation, comprising:
   at least one display device;
   at least one processing unit;
   data tables that are created by utilizing a tabulation program, said data tables including data values that are each associated with identification labels;
   a graphical presentation that is created by utilizing a graphing program to display selected ones of said data values and identification labels in a graphical format;
   an extraction worksheet that a system user creates to specify data selection information and data transfer information for performing said data extraction procedure; and
   an extraction program that references said extraction worksheet to automatically perform said data extraction procedure, said extraction Program electronically scanning said graphical presentation to identify said selected ones of said data values and said identification labels in said graphical presentation, said extraction program then extracting current values for said selected ones of said data values and said identification labels from said data tables, said extraction program utilizing said current values to populate said graphical presentation, said extraction worksheet being initially completed by said system user and then loaded into said extraction program, said extraction program responsively determining one or more specific chart objects to scan based on said extraction worksheet, said extraction program then automatically scanning said one or more specified chart objects, said extraction program selecting specified identification labels from said one or more specified chart objects to be stored in multi-dimensional, dynamic label array structures.

10. The system of claim 9 wherein said extraction program refers to said extraction worksheet to select specified ones of said data tables for said data extraction procedure, said extraction program automatically comparing said multi-dimensional, dynamic label array structures with said data values in said specified ones of said data tables to locate said specified identification labels, said extraction program cross-referencing said specified identification labels to locate said selected ones of said data values, said extraction program then extracting said selected ones of said data values, said extraction program storing said selected ones of said data values in an interim load sheet for automatically populating said one or more specified chart objects.

11. A system for performing a data extraction procedure to automatically populate a graphical presentation, comprising:
   at least one display device;
   at least one Processing unit;
   data tables that are created by utilizing a tabulation program, said data tables including data values that are each associated with identification labels;
   a graphical presentation that is created by utilizing a graphing program to display selected ones of said data values and identification labels in a graphical format;
   an extraction worksheet that a system user creates to specify data selection information and data transfer information for performing said data extraction procedure; and
   an extraction program that references said extraction worksheet to automatically perform said data extraction procedure, said extraction program electronically scanning said graphical presentation to identify said selected ones of said data values and said identification labels in said graphical presentation, said extraction program then extracting current values for said selected ones of said data values and said identification labels from said data tables, said extraction program utilizing said current values to populate said graphical presentation, said extraction program utilizing said extraction worksheet to automatically populate multiple charts from said graphical presentation during a single execution of said data extraction procedure.

12. The system of claim 11 wherein said extraction program populates said multiple charts in said graphical presentation in an order that is based upon data entry positions of respective table information entered by said system user into said extraction worksheet, said extraction program initially populating a first chart object having a smallest coordinate total by using said data values from one of said data tables that is identified in a topmost position in said extraction worksheet, said extraction program then sequentially populating additional chart objects based upon their respective coordinate totals and further sequential data entry positions entered by said system user into said extraction worksheet.

13. A system for performing a data extraction procedure to automatically populate a graphical presentation, comprising:
   at least one display device;
   at least one processing unit;
   data tables that are created by utilizing a tabulation program, said data tables including data values that are each associated with identification labels;
   a graphical presentation that is created by utilizing a graphing program to display selected ones of said data values and identification labels in a graphical format;
   an extraction worksheet that a system user creates to specify data selection information and data transfer information for performing said data extraction procedure; and
   an extraction program that references said extraction worksheet to automatically perform said data extraction procedure, said extraction program electronically scanning said graphical presentation to identify said selected ones of said data values and said identification labels in said graphical presentation, said extraction program then extracting current values for said selected ones of said data values and said identification labels from said data tables, said extraction program utilizing said current values to populate said graphical presentation, a qualifier being specified in a profile file if a proxy label is required for populating said graphical presentation, said proxy label not being present in said data tables, said extraction program automatically populating said graphical presentation even though said datasheet for said graphical presentation does initially not contain all labels necessary to cross-index and thus extract said data values.

14. A system for performing a data extraction procedure to automatically populate a graphical presentation, comprising:

at least one display device;

at least one processing unit;

data tables that are created by utilizing a tabulation program, said data tables including data values that are each associated with identification labels;

a graphical presentation that is created by utilizing a graphing program to display selected ones of said data values and identification labels in a graphical format;

an extraction worksheet that a system user creates to specify data selection information and data transfer information for performing said data extraction procedure; and an extraction program that references said extraction worksheet to automatically perform said data extraction procedure, said extraction program electronically scanning said graphical presentation to identify said selected ones of said data values and said identification labels in said graphical presentation, said extraction program then extracting current values for said selected ones of said data values and said identification labels from said data tables, said extraction program utilizing said current values to populate said graphical presentation, said extraction program including a tab structure repair module that performs a structure check upon said data tables before performing said data extraction procedure, said tab structure repair module performing a table reformatting procedure to make said data tables compatible with said extraction program and said graphing program, said table reformatting procedure being performed according to pre-defined rules that specify that banner headings are formatted to occupy only a single horizontal row, and question identifiers are separated by only a single space.

* * * * *